(12) United States Patent
Gray et al.

(10) Patent No.: US 11,900,068 B1
(45) Date of Patent: *Feb. 13, 2024

(54) GENERATIVE SUMMARIES FOR SEARCH RESULTS

(71) Applicant: GOOGLE LLC, Mountain View, CA (US)

(72) Inventors: Matthew K. Gray, Reading, MA (US); John Blitzer, Mountain View, CA (US); Corinn Herrick, Mountain View, CA (US); Srinivasan Venkatachary, Sunnyvale, CA (US); Jayant Madhavan, San Francisco, CA (US); Sam Oates, Cambridge, MA (US); Phiroze Parakh, San Jose, CA (US); Aditya Shah, Mountain View, CA (US); Mahsan Rofouei, Menlo Park, CA (US); Ibrahim Badr, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/232,112

(22) Filed: Aug. 9, 2023

Related U.S. Application Data

(63) Continuation of application No. 18/123,861, filed on Mar. 20, 2023, now Pat. No. 11,769,017.

(60) Provisional application No. 63/436,416, filed on Dec. 30, 2022.

(51) Int. Cl.
*G06F 40/40* (2020.01)
*G06F 16/332* (2019.01)

(52) U.S. Cl.
CPC .......... *G06F 40/40* (2020.01); *G06F 16/3328* (2019.01)

(58) Field of Classification Search
CPC ..... G06F 40/40; G06F 16/3328; G06F 16/332
See application file for complete search history.

(56) References Cited

U.S. PATENT DOCUMENTS

| 10,783,192 | B1 * | 9/2020 | Soubbotin | G06F 16/2428 |
| 2010/0325131 | A1 | 12/2010 | Dumais | |
| 2012/0210203 | A1 * | 8/2012 | Kandekar | G06F 16/345 715/230 |
| 2018/0067940 | A1 * | 3/2018 | Shin | G06F 16/90335 |
| 2021/0192125 | A1 * | 6/2021 | Deibler | G06F 40/166 |
| 2021/0295822 | A1 * | 9/2021 | Tomkins | G06F 9/547 |

* cited by examiner

*Primary Examiner* — Huyen X Vo
(74) *Attorney, Agent, or Firm* — Gray Ice Higdon

(57) ABSTRACT

At least selectively utilizing a large language model (LLM) in generating a natural language (NL) based summary to be rendered in response to a query. In some implementations, in generating the NL based summary additional content is processed using the LLM. The additional content is in addition to query content of the query itself and, in generating the NL based summary, can be processed using the LLM and along with the query content—or even independent of the query content. Processing the additional content can, for example, mitigate occurrences of the NL based summary including inaccuracies and/or can mitigate occurrences of the NL based summary being over-specified and/or under-specified.

24 Claims, 12 Drawing Sheets

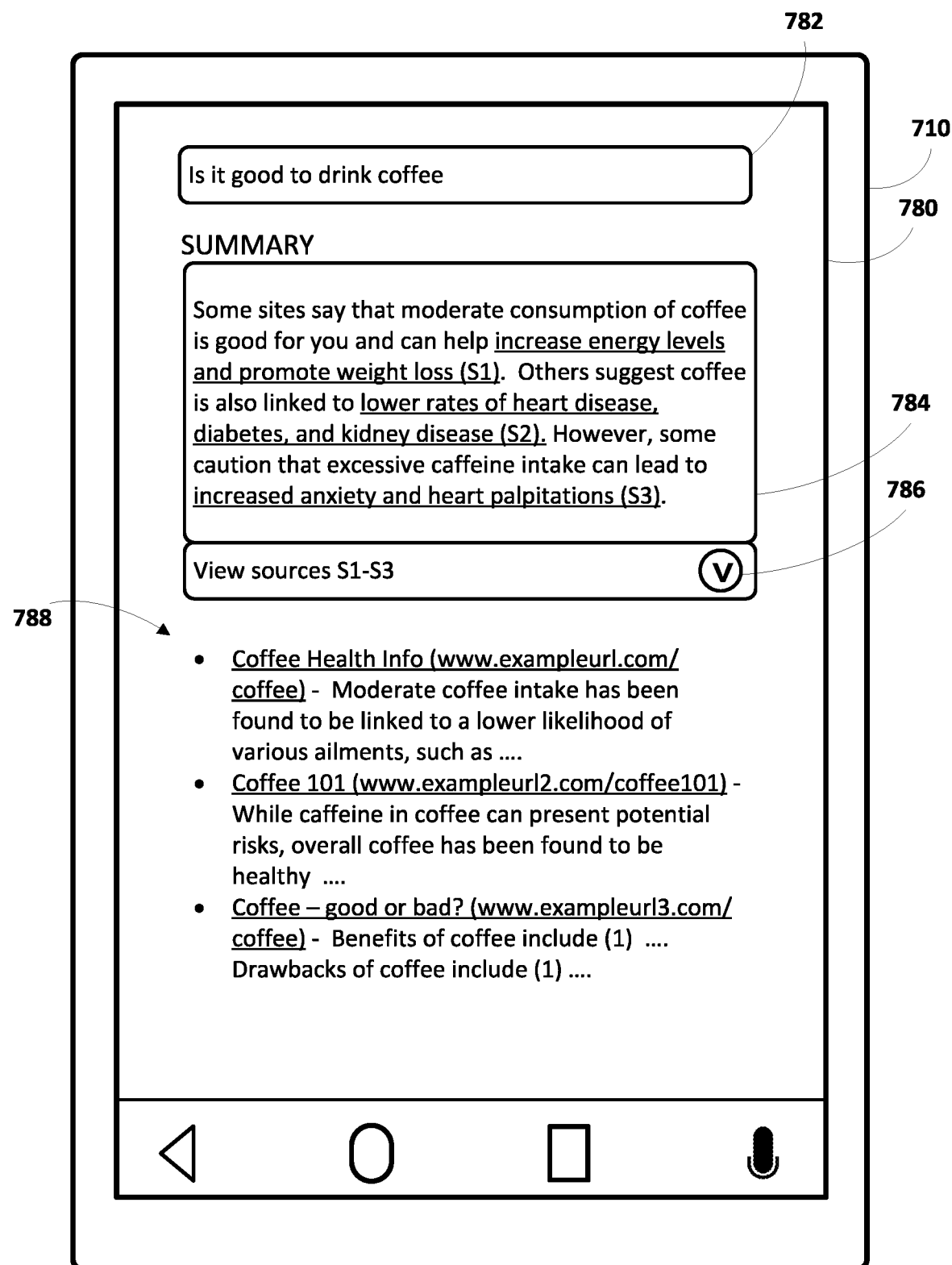
FIG. 7A1

FIG. 7A2

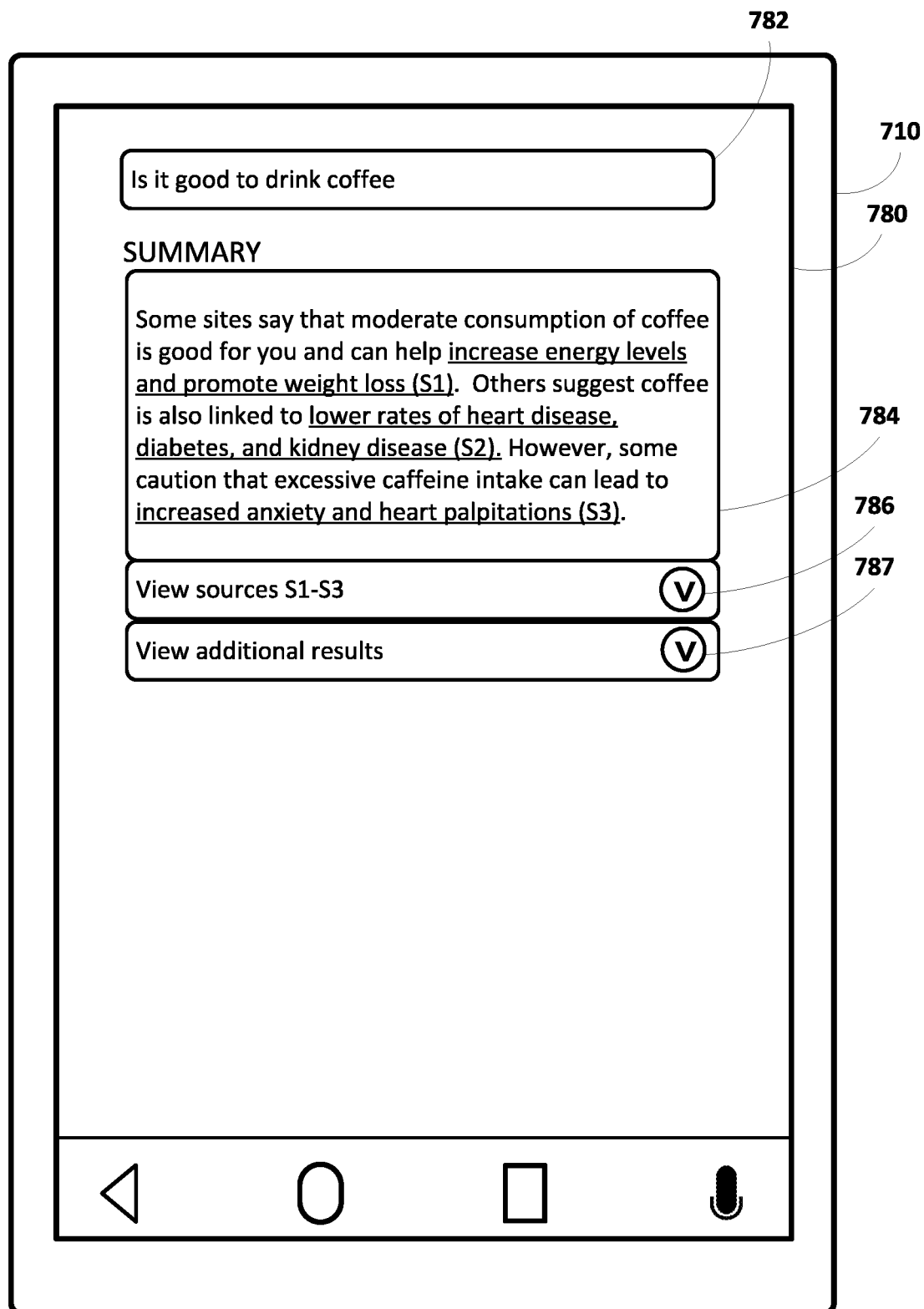
FIG. 7B1 www.exampleurl7.com
S2
HEALTH BENEFITS OF COFEEE 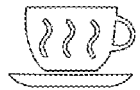
Regular coffee drinkers have been show to have lower rates of diabetes, and heart and kidney disease. More details on each of these follows.
Diabetes
Numerous studies have demonstrated .....
Heart Disease
Various studies have also indicated a link ...
Kidney Disease
Many studies have also shown some correlation ...
.
.
.
.
.
.
   
FIG. 7B2

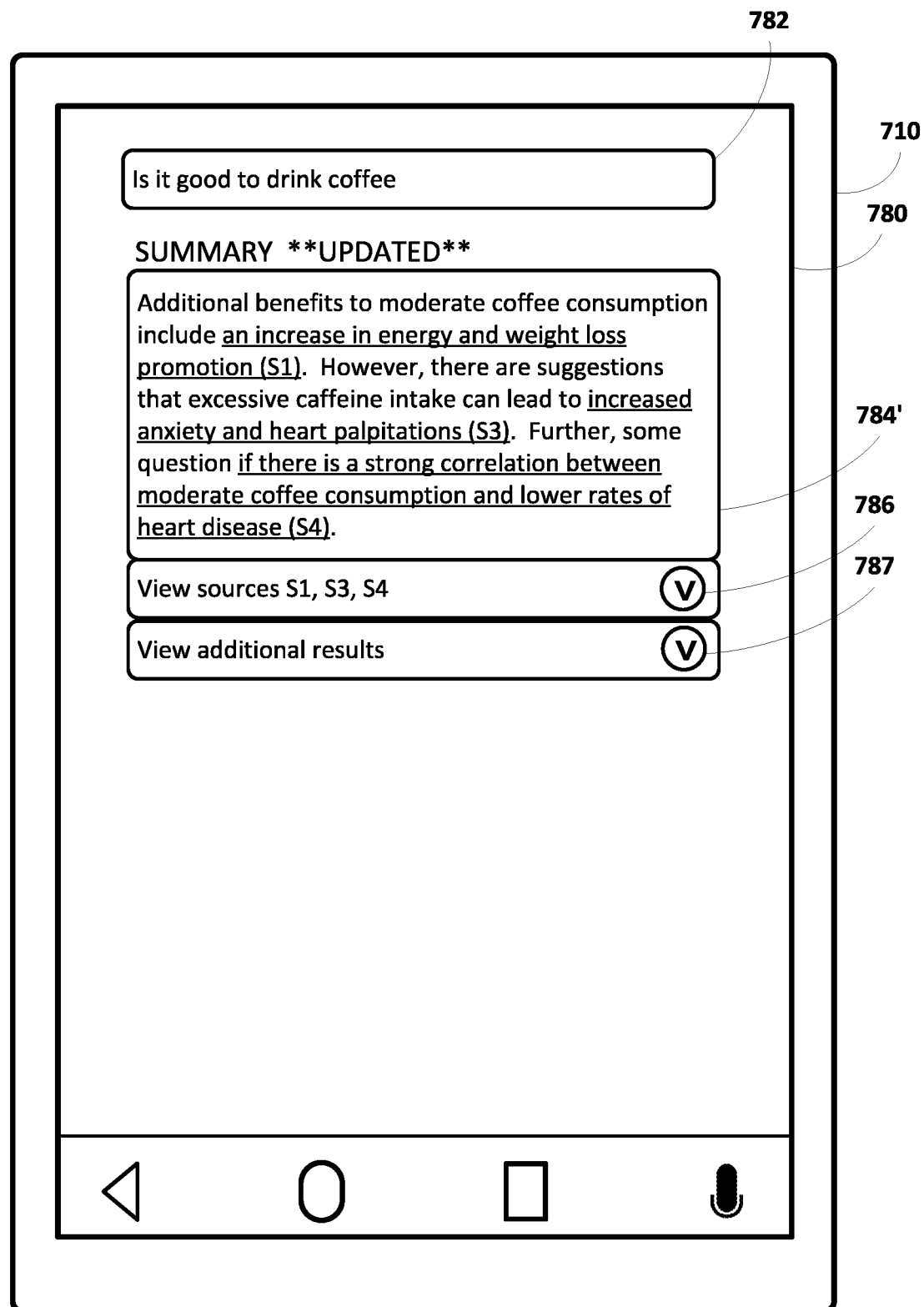
FIG. 7B3

GENERATIVE SUMMARIES FOR SEARCH RESULTS

BACKGROUND

Various generative models have been proposed that can be used to process natural language (NL) content and/or other input(s), to generate output that reflects generative content that is responsive to the input(s). For example, large language models (LLM(s)) have been developed that can be used to process NL content and/or other input(s), to generate LLM output that that reflects NL content and/or other content that is responsive to the input(s). For instance, an LLM can be used to process NL content of "how to change DNS settings on Acme router", to generate LLM output that reflects several responsive NL sentences such as: "First, type the router's IP address in a browser, the default IP address is 192.168.1.1. Then enter username and password, the defaults are admin and admin. Finally, select the advanced settings tab and find the DNS settings section". However, current utilizations of generative models suffer from one or more drawbacks.

As one example, many LLMs can be utilized to generate accurate responses for a large quantity of input(s). However, for many inputs, current utilizations of LLMs can result in at least partially inaccurate responses being generated without any indication that the responses are inaccurate. This can result in an inaccurate response being provided to a user and acted upon by the user, which can prevent a technical task from being completed by the user and/or can cause the user to prolong their interaction with the system (that implements the LLM) to resolve the inaccurate response. Processing an NL query or other input, from a user, can sometimes result in an inaccurate response due to, for example, the LLM not being trained based on fresh training data, the LLM being trained based on inaccurate training data, and/or the LLM producing a so-called hallucination. For instance, the "the default IP address is 192.168.1.1" portion, of the previously provided example responsive NL sentence, can be inaccurate due to the LLM being trained based on stale data that reflects a now inaccurate "192.168.1.1" as the default IP address and/or not being trained on any fresh data that reflects a new default IP address for Acme routers.

As another example, current utilization of LLMs can, for different submissions of an NL query or other input, result in the same LLM output being generated for those submissions and, as a result, the same response based thereon being provided. For example, assume the NL query of "how to change DNS settings on Acme router" is submitted a first time by a first user that is non-tech-savvy and that has not interacted with any Acme router resources, and is submitted a second time by a second user that is tech-savvy and that has interacted extensively with Acme router resources. In such a situation, the same LLM output will be generated, and corresponding response provided, for both submissions. This can result in the response being over-specified for the second user or under-specified for the first user. Over-specification results in the response including more content than needed, which results in excess data transmission and extended rendering as the second user parses all of the content. Under-specification results in additional inputs needing to be provided and processed to generate a complete response.

SUMMARY

Implementations disclosed herein are directed to at least selectively utilizing an LLM in generating an NL based summary to be rendered (e.g., audibly and/or graphically) in response to a query (e.g., a submitted query or an automatically generated query). In many of those implementations, in generating the NL based summary additional content is processed using the LLM. The additional content is in addition to query content of the query itself and, in generating the NL based summary, can be processed using the LLM and along with the query content—or even independent of the query content. Processing the additional content can, for example, mitigate occurrences of the NL based summary including inaccuracies and/or can mitigate occurrences of the NL based summary being over-specified and/or under-specified.

In various implementations differing additional content is processed for different submissions of a given query, which causes differing LLM outputs to be generated based on the processing and, as a result, differing NL based summaries to be provided responsive to the different submissions. In these and other manners, those various implementations ensure that an NL based summary provided responsive to submission of a query is responsive not only to the query, but also responsive to the particular submission of the query (e.g., via processing of corresponding additional content that can be specific to the particular submission). This enables effective guiding of a human-to-computer interaction in which the query was submitted, and ensures that the NL based summary resonates with the user that submitted the query.

In some implementations, the additional content that is processed, using the LLM in generating the NL based summary to provide responsive to submission of a query, includes: content from query-responsive search result document(s) that are responsive to the query; and/or content from other search result document(s) that are each responsive to a corresponding other query, such as another query determined to have a relationship to the query and/or to the submission of the query. The one or more other queries can include one or more related queries (e.g., often issued, among a population of users, in close temporal proximity to the query), one or more recent queries (e.g., submitted within close temporal proximity of the submission of the query and/or having topical overlap with the query), and/or one or more implied queries (e.g., automatically generated based on, for example, context and/or profile data). The search result document(s), from which the content is obtained, can be a subset of the search result document(s) that are responsive to the query and/or to one or more other queries. The subset can be selected based on feature(s) of the search result document(s), such as query-dependent measure(s), query-independent measure(s), and/or user-dependent measure(s) of the search result document(s). The content, from a search result document, can include, for example, text content, image content, and/or video content. The content, from a search result document, can be a subset of the content of the search result document. The subset of the content of a search result document can be selected based on it being determined to have a correlation to the submitted query and/or to a corresponding other query to which it is responsive.

As one example, assume a given query is submitted, such as a given query formulated and submitted based on user input, or an implied query that is automatically formulated and optionally automatically submitted. In response to submission of the given query, a search can performed for the given query to obtain query-responsive search result documents, a search can be performed for a related query to generate related-query-responsive search result documents, and recent-search-responsive search result documents that were responsive to a recent query can be obtained. Further, search result documents A and B can be selected from the query-responsive search result documents, search result document C can be selected from the related-query-responsive search result documents, and search result document D can be selected from recent-search-responsive search result documents. Yet further, content A can be selected from search result document A, and contents B, C, and D can be selected from respective ones of search result documents B, C, and D. Contents A, B, C, and D can then be included in the additional content that is processed using the LLM in generating the NL based summary to provide responsive to submission of the query. For instance, a prompt of "Summarize <Content A>, <Content B>, <Content C>, and <Content D>" (which omits the query itself) can be processed using the LLM to generate the NL based summary. Also, for instance, a prompt of "In the context of <query>, summarize <Content A>, <Content B>, <Content C>, and <Content D>" can be processed using the LLM to generate the NL based summary.

In implementations where the additional content includes content from query-responsive search result document(s) and/or content from other search result document(s), occurrences of the NL based summary including inaccuracies can be mitigated. This can be due to, for example, such content being more up to date than training data on which the LLM has been trained. However, it is noted that the NL based summary can still include portions that are generated based on prior training of the LLM and independent of (but contingent on) the content from the search result document(s) that is processed using the LLM. In these and other manners, implementations leverage robustness of the LLM in generating the NL based summary while ensuring accuracy through processing of the additional content. In implementations where the additional content includes content from query-responsive search result document(s) and/or content from other search result document(s), occurrences of the NL based summary being over-specified and/or under-specified can also be mitigated. This can be due to, for example, the search result document(s) that are responsive to the query being based on location and/or other attribute(s) of submission of the query and/or the set of search result document(s), that are selected, being selected based on query-dependent measure(s), user-dependent measure(s), and/or other measure(s). With the advent of LLM and their power to generate content, a nascent technical field of prompt engineering is emerging, by which an improved formulation of the prompt results in improved information retrieval by the LLM. Prompt engineering to date is more of an art form than a science and much based on trial and error. Augmenting LLM prompts based on search result(s), as proposed by various implementations disclosed herein, provides an objective basis to improve information retrieval by the LLM that does not rely on hard to codify experience of prompt engineering.

In some implementations, the additional content that is processed, using the LLM in generating the NL based summary to provide responsive to submission of a query, additionally or alternatively includes content that reflects the occurrence of interaction(s) with search result document(s) provided initially in response to submission of the query. For example, assume a user submits a query and, in response, search result(s) corresponding to search result document(s) are provided, optionally along with an initial NL based summary. Further assume that the user interacts with one or more of those search result(s). In response, additional content, that reflects the occurrence of the interaction(s), can be processed using the LLM to generate the LLM based summary. The generated LLM based summary will be revised, relative to any initial NL based summary, in response to the processing of the additional content in the generating.

As a particular example, assume the user initially issues a query of "how to change DNS settings on Acme router". Further assume that the query and/or content from search result document(s) responsive to the query are processed, using an LLM, to generate an NL based summary such as: "First, type the router's IP address in a browser, the default IP address is 192.168.1.1. Then enter username and password, the defaults are admin and admin. Finally, select the advanced settings tab and find the DNS settings section". Further assume that the LLM based summary is provided with linkified portions and/or along with additional search result(s), and the user interacts with a search result document (from a linkified portion or an additional search result) that includes details on Acme router's IP address and default username and password, but lacks any specifics on changing Acme router's DNS settings. In such a situation, and in response to the interaction, additional content that reflects the interaction can be processed, using the LLM, to generate a revised NL based summary such as "Once you've logged into the router, select the advanced settings tab and find the DNS settings section, which will be at the top. The DNS settings section will include a free-form entry field where you can enter the preferred DNS information". As a result of the revised input reflecting familiarity with content of the search result document(s) interacted with, the revised NL based summary is updated in view of that familiarity. The additional content that reflects the interaction can be, for example, "assume the user already knows X", where "X" is a description of the content of the SRD(s) interacted with. In these and other manners, the revised NL based summary guides the human-to-computer interaction by being updated to reflect interaction(s) with search result document(s) that occurred thus far in the interaction. Accordingly, through the revised NL based summary, the user is guided to additional information that facilitates the user accomplishing their task, where the additional information accounts for the interaction(s) with search result document(s) that have already occurred during the human-to-computer interaction. In various implementations, the LLM can be seen as a database structure, with information stored in the parameters of the LLM, and the augmentation of the input to the LLM with additional information (e.g., based on search result(s) that have been interacted with) can be seen as a revised database query that facilitates a more focused retrieval of information from the database without requiring additional interaction from the user, as would be the case if a database access query would be revised manually by a user.

In some implementations, the additional content that is processed, using the LLM in generating the NL based summary to provide responsive to submission of a query, additionally or alternatively includes content that reflects familiarity of the user with certain content that is responsive to the query. For example, it can be determined, based on a profile associated with the query (e.g., a device profile of the client device via which the query was submitted and/or a user profile of the submitter), whether the submitter of the query is already familiar with certain content that is responsive to the query. If so, additional content, that reflects familiarity of the user with the certain content, can be processed using the LLM in generating the NL based summary.

For example, if it is determined that the user is familiar with "X content", a prompt of "assuming the user is familiar with [description of the certain content] answer [query]" can be processed using the LLM in generating the NL based summary. In contrast, if it is determined that the user is not familiar with any content responsive to the query, a prompt of "answer [query]" can be processed using the LLM in generating the NL based summary. As another example, if it is determined that the user is familiar with "X content", a prompt of "assuming the user is familiar with [description of the certain content] summarize [search result document content]" can be processed using the LLM in generating the NL based summary. In contrast, if it is determined that the user is not familiar with any content responsive to the query, a prompt of "summarize [search result document content]" can be processed using the LLM in generating the NL based summary".

In some implementations, the additional content that is processed, using the LLM in generating the NL based summary to provide responsive to submission of a query, additionally or alternatively includes content that reflects familiarity of the user with certain content that is responsive to the query. For example, it can be determined, based on a profile associated with the query (e.g., a device profile of the client device via which the query was submitted and/or a user profile of the submitter), whether the submitter of the query is already familiar with certain content that is responsive to the query. If so, additional content, that reflects familiarity of the user with the certain content, can be processed using the LLM in generating the NL based summary.

For example, if it is determined that the user is familiar with "X content", a prompt of "assuming the user is familiar with [description of the certain content] answer [query]" can be processed using the LLM in generating the NL based summary. In contrast, if it is determined that the user is not familiar with any content responsive to the query, a prompt of "answer [query]" can be processed using the LLM in generating the NL based summary. As another example, if it is determined that the user is familiar with "X content", a prompt of "assuming the user is familiar with [description of the certain content] summarize [search result document content]" can be processed using the LLM in generating the NL based summary. In contrast, if it is determined that the user is not familiar with any content responsive to the query, a prompt of "summarize [search result document content]" can be processed using the LLM in generating the NL based summary".

In these and other manners, the generated NL based summary is more likely to resonate with the user and is more likely to omit any content with which the user is already familiar. This enable the user to more quickly ascertain content that is truly relevant to the user accomplishing their task, reducing the overall duration of the human-to-computer interaction. By refining the LLM input based on user interaction(s), such as based on SRD(s) accessed by the user, the summary produced by the LLM will be made more objectively and conveniently more relevant to the user's subjective preferences by incorporating information from accessed SRD(s) without requiring any additional action by the user.

In some implementations, an LLM can include at least hundreds of millions of parameters. In some of those implementations, the LLM includes at least billions of parameters, such as one hundred billion or more parameters. In some additional or alternative implementations, an LLM is a sequence-to-sequence model, is Transformer-based, and/or can include an encoder and/or a decoder. One non-limiting example of an LLM is GOOGLE'S Pathways Language Model (PaLM). Another non-limiting example of an LLM is GOOGLE'S Language Model for Dialogue Applications (LaMDA).

The preceding is presented as an overview of only some implementations disclosed herein. These and other implementations are disclosed in additional detail herein. For example, additional and/or alternative implementations are disclosed herein such as those directed to automatically linkifying generated NL based summaries, determining confidence measure(s) for NL based summaries and determining whether to and/or how to render NL based summaries based on the confidence measure(s), and/or determining whether to utilize one, none, or multiple LLM(s) in processing a query.

BRIEF DESCRIPTION OF THE DRAWINGS

FIG. 7A1 depicts an example client device rendering a graphical interface that includes an example NL based summary and additional example search results that are rendered in response to a query.

FIG. 7A2 depicts the example client device and graphical interface of FIG. 7A1, after a user has interacted with an interface element to view search results for search result document sources utilized in generating the example NL based summary of FIG. 7A1.

FIG. 7B1 depicts the example client device rendering a graphical interface that includes an example NL based summary, but that does include additional example search results that are rendered in response to a query.

FIG. 7B2 depicts the example client device interacting with a search result document, that is responsive to the query of FIG. 7B1, after the example NL based summary of FIG. 7B1 was rendered.

FIG. 7B3 depicts the example client device rendering a graphical interface that includes an example revised NL based summary, generated based on the interaction with the search result document of FIG. 7B2.

DETAILED DESCRIPTION

Figure 1:
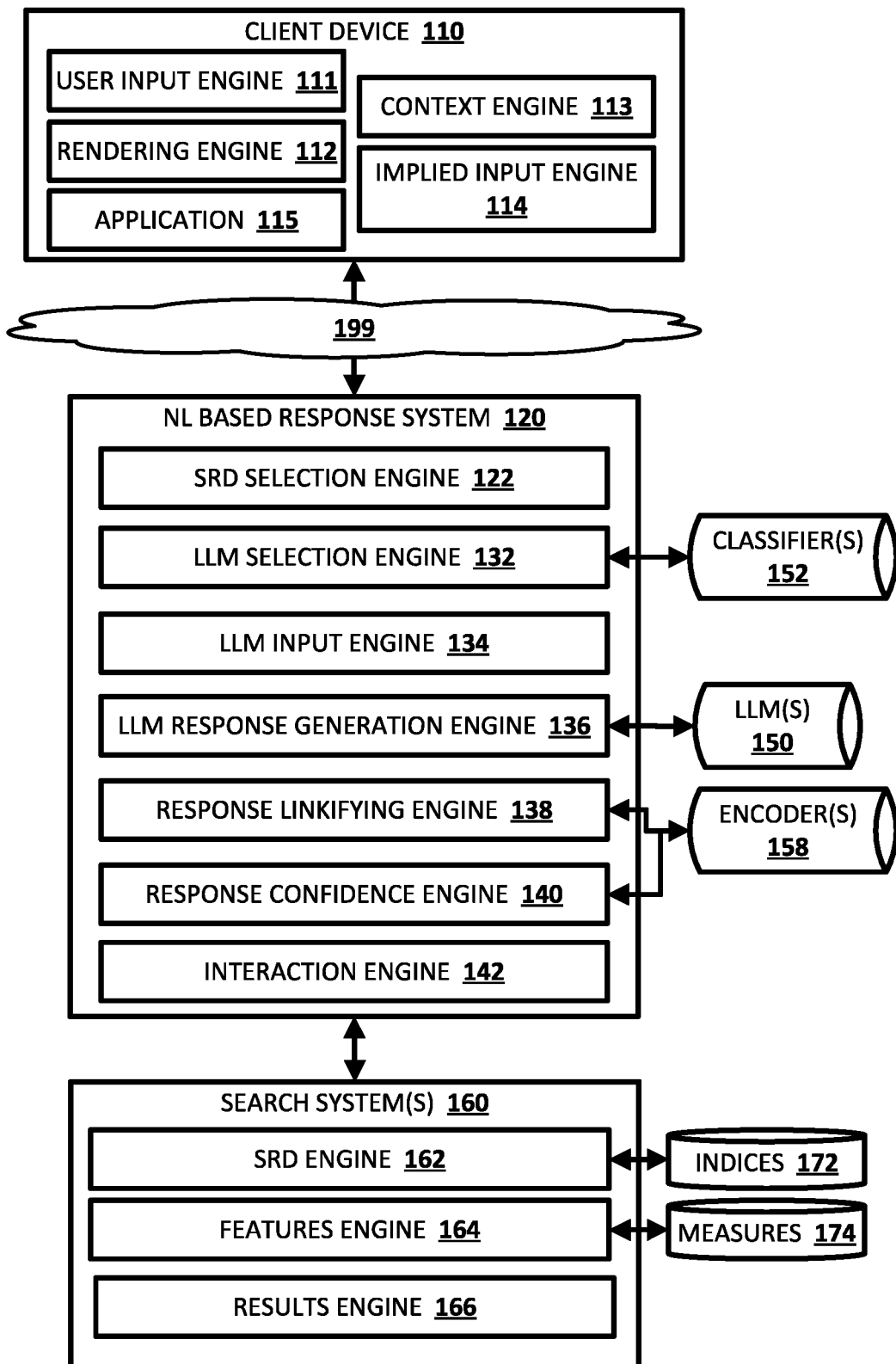
FIG. 1 depicts a block diagram of an example environment that demonstrates various aspects of the present disclosure, and in which some implementations disclosed herein can be implemented.

Turning now to FIG. 1, a block diagram of an example environment 100 that demonstrates various aspects of the present disclosure, and in which implementations disclosed herein can be implemented is depicted. The example environment 100 includes a client device 110, a natural language (NL) based response system 120, and search system(s) 160. Although illustrated separately, in some implementations all or aspects of NL based response system 120 and all or aspects of search system(s) 160 can be implemented as part of a cohesive system.

In some implementations, all or aspects of the NL based response system 120 can be implemented locally at the client device 110. In additional or alternative implementations, all or aspects of the NL based response system 120 can be implemented remotely from the client device 110 as depicted in FIG. 1 (e.g., at remote server(s)). In those implementations, the client device 110 and the NL based response system 120 can be communicatively coupled with each other via one or more networks 199, such as one or more wired or wireless local area networks ("LANs," including Wi-Fi LANs, mesh networks, Bluetooth, near-field communication, etc.) or wide area networks ("WANs", including the Internet).

The client device 110 can be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

The client device 110 can execute one or more applications, such as application 115, via which queries can be submitted and/or NL based summaries and/or other response(s) to the query can be rendered (e.g., audibly and/or visually). The application 115 can be an application that is separate from an operating system of the client device 110 (e.g., one installed "on top" of the operating system)—or can alternatively be implemented directly by the operating system of the client device 110. For example, the application 115 can be a web browser installed on top of the operating system, or can be an application that is integrated as part of the operating system functionality. The application 115 can interact with the NL based response system 120.

In various implementations, the client device 110 can include a user input engine 111 that is configured to detect user input provided by a user of the client device 110 using one or more user interface input devices. For example, the client device 110 can be equipped with one or more microphones that capture audio data, such as audio data corresponding to spoken utterances of the user or other sounds in an environment of the client device 110. Additionally, or alternatively, the client device 110 can be equipped with one or more vision components that are configured to capture vision data corresponding to images and/or movements (e.g., gestures) detected in a field of view of one or more of the vision components. Additionally, or alternatively, the client device 110 can be equipped with one or more touch sensitive components (e.g., a keyboard and mouse, a stylus, a touch screen, a touch panel, one or more hardware buttons, etc.) that are configured to capture signal(s) corresponding to touch input directed to the client device 110. Some instances of a query described herein can be a query that is formulated based on user input provided by a user of the client device 110 and detected via user input engine 111. For example, the query can be a typed query that is typed via a physical or virtual keyboard, a suggested query that is selected via a touch screen or a mouse, a spoken voice query that is detected via microphone(s) of the client device, or an image query that is based on an image captured by a vision component of the client device.

In various implementations, the client device 110 can include a rendering engine 112 that is configured to provide content (e.g., an NL based summary) for audible and/or visual presentation to a user of the client device 110 using one or more user interface output devices. For example, the client device 110 can be equipped with one or more speakers that enable content to be provided for audible presentation to the user via the client device 110. Additionally, or alternatively, the client device 110 can be equipped with a display or projector that enables content to be provided for visual presentation to the user via the client device 110.

In various implementations, the client device 110 can include a context engine 113 that is configured to determine a context (e.g., current or recent context) of the client device 110 and/or of a user of the client device 110. In some of those implementations, the context engine 113 can determine a context utilizing current or recent interaction(s) via the client device 110, a location of the client device 110, profile data of a profile of a user of the client device 110 (e.g., an active user when multiple profiles are associated with the client device 110), and/or other data accessible to the context engine 113. For example, the context engine 113 can determine a current context based on a current state of a query session (e.g., considering one or more recent queries of the query session), profile data, and/or a current location of the client device 110. For instance, the context engine 113 can determine a current context of "looking for a healthy lunch restaurant in Louisville, Kentucky" based on a recently issued query, profile data, and a location of the client device 110. As another example, the context engine 113 can determine a current context based on which application is active in the foreground of the client device 110, a current or recent state of the active application, and/or content currently or recently rendered by the active application. A context determined by the context engine 113 can be utilized, for example, in supplementing or rewriting a query that is formulated based on user input, in generating an implied query (e.g., a query formulated independent of user input), and/or in determining to submit an implied query and/or to render result(s) (e.g., an NL based summary) for an implied query.

In various implementations, the client device 110 can include an implied input engine 114 that is configured to: generate an implied query independent of any user input directed to formulating the implied query; to submit an implied query, optionally independent of any user input that requests submission of the implied query; and/or to cause rendering of result(s) for an implied query, optionally independent of any user input that requests rendering of the result(s)). For example, the implied input engine 114 can use current context, from context engine 113, in generating an implied query, determining to submit the implied query, and/or in determining to cause rendering of result(s) for the implied query. For instance, the implied input engine 114 can automatically generate and automatically submit an implied query based on the current context. Further, the implied input engine 114 can automatically push result(s) to the implied query to cause them to be automatically rendered or can automatically push a notification of the result(s), such as a selectable notification that, when selected, causes rendering of the result(s). As another example, the implied input engine 114 can generate an implied query based on profile data (e.g., an implied query related to an interest of a user), submit the query at regular or non-regular intervals, and cause corresponding result(s) for the submission(s) to be automatically provided (or a notification thereof automatically provided). For instance, the implied query can be "patent news" based on profile data indicating interest in patents, the implied query periodically submitted, and a corresponding NL based summary result automatically rendered. It is noted that the provided NL based summary result can vary over time in view of e.g., presence of new/fresh search result document(s) over time.

Further, the client device 110 and/or the NL based response system 120 can include one or more memories for storage of data and/or software applications, one or more processors for accessing data and executing the software applications, and/or other components that facilitate communication over one or more of the networks 199. In some implementations, one or more of the software applications can be installed locally at the client device 110, whereas in other implementations one or more of the software applications can be hosted remotely (e.g., by one or more servers) and can be accessible by the client device 110 over one or more of the networks 199.

Although aspects of FIG. 1 are illustrated or described with respect to a single client device having a single user, it should be understood that is for the sake of example and is not meant to be limiting. For example, one or more additional client devices of a user and/or of additional user(s) can also implement the techniques described herein. For instance, the client device 110, the one or more additional client devices, and/or any other computing devices of a user can form an ecosystem of devices that can employ techniques described herein. These additional client devices and/or computing devices may be in communication with the client device 110 (e.g., over the network(s) 199). As another example, a given client device can be utilized by multiple users in a shared setting (e.g., a group of users, a household).

NL based response system 120 is illustrated as including a search result document (SRD) selection engine 122, an LLM selection engine 132, an LLM input engine 134, an LLM response generation engine 136, a response linkifying engine 138, a response confidence engine 140, and an interaction engine 142. Some of the engines can be omitted in various implementations.

The SRD selection engine 122 can, in response to receiving a query, generate a set of SRD(s) based on the query. The SRD selection engine 122 can, in generating the set, select SRD(s) that are responsive to the query, select SRD(s) that are responsive to one or more related-queries, select SRD(s) that are responsive to one or more recent-queries, and/or select SRD(s) that are responsive to one or more implied queries. In various implementations, the SRD selection engine 122 can perform all or aspects of blocks 254, 256, 258, and 259 of method 200 of FIG. 2.

The LLM selection engine 132 can, in response to receiving a query, determine which, if any, of multiple generative model(s) (LLM(s) and/or other generative model(s)) to utilize in generating response(s) to render responsive to the query. For example, the LLM selection engine 132 can select none, one, or multiple generative model(s) to utilize in generating response(s) to render responsive to a query. In various implementations, the LLM selection engine 132 can perform all or aspects of block 554 of method 500 of FIG. 5. The LLM selection engine 132 can optionally utilize one or more classifiers 152 and/or rules (not illustrated).

The LLM input engine 134 can, in response to receiving a query, generate LLM input that is to be processed using an LLM in generating an NL based response to the query. As described herein, such content can include query content that is based on the query and/or additional content. In various implementations, the LLM input engine 134 can perform all or aspects of sub-block 260A of method 200 of FIG. 2, aspects of blocks 454 and 460 of method 400 of FIG. 4, and/or aspects of block 658 and block 660 of FIG. 6, etc.

The LLM response generation engine 136 can process LLM input, that is generated by the LLM input engine 134, using an LLM to generate an NL based summary. In various implementations, the LLM response generation engine 136 can perform all or aspects of block 260 of method 200 of FIG. 2, blocks 454 and 460 of method 400 of FIG. 4, block 556 of method 500 of FIG. 5, and/or block 660 and 658 of method 600 of FIG. 6. The LLM response generation engine 136 can utilize one or more LLMs 150.

The response linkifying engine 138 can linkify all or portions of an NL based summary generated by the LLM response generation engine 136. In various implementations, the response linkifying engine 138 can perform all or aspects of blocks 262A and 262C of method 200 of FIG. 2 and/or blocks 356, 358, 360, 362, 364, 366, and 368 of method 300 of FIG. 3. The response linkifying engine 138 can optionally utilize encoder(s) 158 and/or other embedding generation model(s).

The response confidence engine 140 can determine confidence measures for portions of a generated NL based summary and/or for a generated NL based summary as a whole. In various implementations, the response confidence engine 140 can perform all or aspects of blocks 262B and 262C of method 200 of FIG. 2. The response confidence engine 140 can optionally utilize encoder(s) 158 and/or other embedding generation model(s).

The interaction engine 142 can detect interaction(s) with search result document(s), provided in response to a query, and provide indications of such interaction(s) to the LLM input engine 134 for generation of a revised LLM input. In various implementations, the interaction engine 142 can perform all or aspects of block 458 of method 400 of FIG. 4.

Search system 160 is illustrated as including a SRD engine 162, a features engine 164, and a results engine 166. Some of the engines can be omitted in various implementations.

The SRD engine 162 can, for example, utilize indices 172 and/or other resources in identifying search result documents that are responsive to queries as described herein. The feature(s) engine 164 can generate one or more of the measures, for search result documents, described herein and can optionally utilize measures database 174 in doing so. The results engine 166 can generate non-LLM generated search results that can optionally be presented along with an NL based summary described herein.

Figure 2:
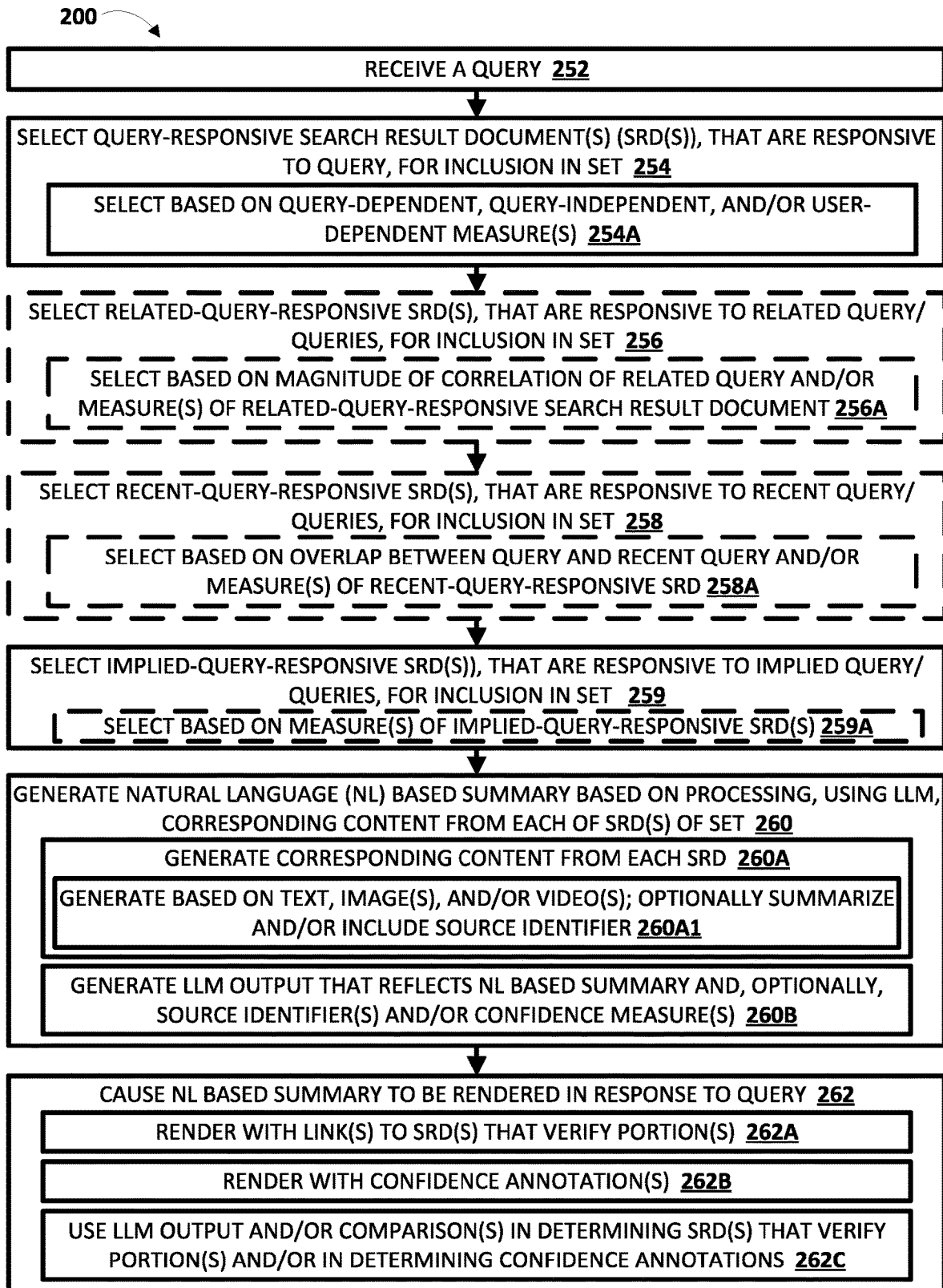
FIG. 2 depicts a flowchart illustrating an example method of generating, using a large language model (LLM) and search result documents that are responsive to a query, a natural language (NL) based summary response to the query, and causing the NL based summary to be rendered in response to the query.

Turning now to FIG. 2, a flowchart is depicted that illustrates an example method 200 of generating, using an LLM and search result documents that are responsive to a query, an NL based summary response to the query, and causing the NL based summary to be rendered in response to the query. For convenience, the operations of the method 200 are described with reference to a system that performs the operations. This system of the method 200 includes one or more processors, memory, and/or other component(s) of computing device(s) (e.g., client device 110 of FIG. 1, client device 810 of FIG. 8, and/or computing device 710 of FIGS. 7A1, 7A2, 7B1, 7B2, and 7B3, one or more servers, and/or other computing devices). Moreover, while operations of the method 200 are shown in a particular order, this is not meant to be limiting. One or more operations may be reordered, omitted, and/or added.

At block 252, the system receives a query. The query can be one formulated based on user interface input at a client device, such as typed input, voice input, input to cause an image to be captured or selected, etc. The query can be, for example, a voice query, a typed query, an image-based query, a multimodal query (e.g., that includes voice input and an image), or an inferred/parameterless query. In some implementations, when the query includes content that is not in textual format, the system can convert the query to a textual format or other format. For example, if the query is a voice query the system can perform automatic speech recognition (ASR) to convert the query to textual format. As another example, assume the query is a multimodal query that includes an image of an avocado and a voice input of "is this healthy". In such an example, the system can perform ASR to convert the voice input to text form, can perform image processing on the image to recognize an avocado is present in the image, and can perform co-reference resolution to replace "this" with "an avocado", resulting in a textual format query of "is an avocado healthy".

The query can alternatively be an implied query, such as one formulated and/or submitted independent of any user input directed to formulating the implied query. For example, the query can be an implied query that is automatically generated based on profile data and that is automatically submitted. For instance, the implied query can be "machine learning", based on profile data indicating interest in machine learning topic(s). As another example, the query can be an implied query that is automatically generated and/or automatically submitted based on a current and/or recent context. As yet another example, the query can be an implied query that is submitted based on the user providing some indication of a desire to perform a search (e.g., pushing a search button, performing a search touch gesture, accessing a particular screen or state of an application), but that is generated automatically based on content currently being displayed at a client device, location, time of day, and/or other context signal(s).

At block 254, the system selects one or more query-responsive search result documents (SRDs), that are responsive to the query of block 252, for inclusion in a set. For example, the system can select, for inclusion in the set, a subset of query-responsive SRDs that the system and/or a separate search system have identified as responsive to the query. For instance, the system can select the top N (e.g., 2, 3, or other quantity) query-responsive SRDs as determined by a search system or can select up to N query-responsive SRDs that have feature(s), as determined by the system, that satisfy one or more criteria.

In some implementations, block 254 includes sub-block 254A in which selecting the set of query-responsive SRDs can be based on query-dependent measure(s), query-independent measure(s), and/or user-dependent measure(s) for the query-responsive SRDs. In some implementations, the system includes a search system that optionally generates one or more of such measures. In some implementations, the system excludes a search system, but receives one or more of such measure(s) from the search system and/or generates one or more of such measures independent of the search system.

Query-dependent measures for a query-responsive SRD can include, for example, a positional ranking of the query-responsive search result document and for the query, a selection rate of the query-responsive search result document and for the query, a locality measure that is based on an origination location of the query and a location corresponding to the query-responsive search result document, and/or a language measure that is based on a language of the query and a language corresponding to the query-responsive search result document.

Query-independent measures for a query-responsive SRD can include, for example, a selection rate of the query-responsive search result document for multiple queries, a trustworthiness measure for the query-responsive search result document (e.g., one generated based on an author thereof, a domain thereof, and/or inbound link(s) thereto), an overall popularity measure for the query-responsive search result document, and/or a freshness measure that reflects recency of creation or updating of the query-responsive search result document.

User-dependent measures for a query-responsive SRD can be based on, for example, relation of the query-responsive search result document to: attributes of a user profile for the query, recent queries at the client device or via the user profile, and/or recent non-query interactions at the client device or via the user profile. For example, if a user profile indicates a user is a movie buff, then user-dependent measure(s) for an SRD pertaining to a movie can result in the SRD more likely being selected for inclusion in the set than if the user profile did not indicate the user is a movie buff.

It is noted that, by considering query-dependent and/or user-specific measure(s) in selecting the set at block 254A, different sets can be determined for different submissions of the same query. For example, using a locality measure can lead to a first set of query-specific SRDs for the query of "history of Louisville" submitted from Louisville, Kentucky and a distinct second set of query-specific SRDs for the query of "history of Louisville" submitted from Louisville, Colorado. As described herein, differing sets of SRD(s) will result in differing generated NL based summaries. For example, differing sets of SRDs will result in differing content, from the SRDs of the respective set, being processed using the LLM in generating the respective NL based summary. Accordingly, differing generated NL based summaries will be provided for different submissions of the same query. This enables provisioning of NL based summaries that are more likely to efficiently resolve a querying user's informational needs, and that are generated in dependence on query-dependent and/or user-specific dependent considerations (e.g., query location, query language, and/or attribute(s) of a user profile). Further, this enables provisioning of NL based summaries without the need for any additional interaction from the user. For example, it enables additional information, additional to the query, such as location information or query history information, to be leveraged to provide a more targeted prompt and hence a more targeted LLM summary and therefore enables more efficient access to the information stored in the LLM.

At optional block 256, the system selects, for inclusion in the set, one or more related-query-responsive SRDs, that are responsive to one or more related queries that are determined to be related to the query of block 252. In some implementations, whether block 256 is performed can be based on a magnitude of correlation between the query and one or more related queries (described below) and/or based on characteristic(s) of the query-responsive search result document(s) for the query. For example, block 256 can be performed based on the query-responsive search result document(s), for the query, not being diverse relative to one another, being of low quality, and/or having other characteristic(s)). As another example, block 256 can be performed based on considering both: characteristic(s) of the query-responsive search result document(s) for the query; and a magnitude of the correlation between the query and the one or more related queries. For instance, block 256 can be performed only when the query-responsive search result document(s) are of low quality and/or not diverse relative to one another, and the magnitude of the correlation satisfies a threshold. Accordingly, performance of block 256 can be selective, and selective based on one or more objective criteria that seek to select related-query-responsive SRDs only when doing so is likely to lead to generation of a more accurate and/or more appropriately specified NL based summary. In these and other manners, the efficiencies that can be achieved in generating and providing a more accurate NL based summary are balanced with the additional computational and/or network resources utilized in obtaining and/or processing the related-query-responsive SRDs.

In some implementations, block 256 includes sub-block 256A, in which the system determines whether to select a related-query-responsive SRD, that is responsive to a related query, for inclusion in the set based on (a) a magnitude of correlation of the related query to the query and/or (b) measures of the related-query-responsive SRD. The (b) measures of the related-query-responsive SRD can include query-dependent measure(s) (for the related query to which the related-query-responsive SRD is responsive), query-independent measure(s) for the related-query-responsive SRD, and/or user-dependent measure(s) for the related-query-responsive SRD. The (a) magnitude of correlation of the related query to the query can reflect a strength of the correlation. For example, the (a) magnitude of correlation of the related query to the query can be based on a quantity of occurrences of the query and the related query both being issued by a corresponding device or account within temporal proximity of one another.

At optional block 258, the system selects, for inclusion in the set, one or more recent-query-responsive SRDs, that are responsive to one or more recent queries that were recently submitted by the client device that submitted the query and/or that were recently submitted by a user account that submitted the query. In some implementations, whether block 258 is performed can be based on an overlap between the query and a recent query (described below) and/or based on characteristic(s) of the query-responsive search result document(s) for the query. For example, block 258 can be performed based on the query-responsive search result document(s), for the query, not being diverse relative to one another, being of low quality, and/or having other characteristic(s)). As another example, block 258 can be performed based on considering both: characteristic(s) of the query-responsive search result document(s) for the query; and a degree of overlap between the query and a recent query. For instance, block 258 can be performed only when the query-responsive search result document(s) are of low quality and/or not diverse relative to one another, and the degree of overlap satisfies a threshold. Accordingly, performance of block 258 can be selective, and selective based on one or more objective criteria that seek to select recent-query-responsive SRDs only when doing so is likely to lead to generation of a more accurate and/or more appropriately specified NL based summary. In these and other manners, the efficiencies that can be achieved in generating and providing a more accurate NL based summary are balanced with the additional computational and/or network resources utilized in obtaining and/or processing the related-query-responsive SRDs.

In some implementations, block 258 includes sub-block 258A, in which the system determines whether to select a recent-query-responsive SRD, that is responsive to a related query, for inclusion in the set based on (a) overlap between the query and recent query and/or (b) measure(s) of the recent-query-responsive SRD. The (b) measure(s) of the recent-query-responsive SRD can include query-dependent measure(s) (for the recent query to which the recent-query-responsive SRD is responsive), query-independent measure(s) for the recent-query-responsive SRD, and/or user-dependent measure(s) for the recent-query-responsive SRD. The (a) overlap between the query and recent query can be based on, for example, an amount of time passage between the query and the recent query and/or a degree of topical and/or entity overlap between the query and the recent query. For example, a recent-query-responsive SRD can be more likely to be selected when the recent query was issued temporally close to the query and when the recent query has topical overlap with the query.

At optional block 259, the system selects, for inclusion in the set, one or more implied-query-responsive SRDs, that are responsive to one or more implied queries. The one or more implied queries can be automatically generated based on, for example, context and/or profile data and, optionally, taking into account the query of block 252 (e.g., when the query of block 252 is based on user input). For example, an implied query can be automatically generated based on the query of block 252 and based on a current or recent context. In some implementations, whether block 259 is performed can be based on an overlap between the query and a current and/or recent context, overlap between the query and profile data, and/or based on characteristic(s) of the query-responsive search result document(s) for the query. For example, block 259 can be performed based on the query-responsive search result document(s), for the query, not being diverse relative to one another, being of low quality, and/or having other characteristic(s)). As another example, block 259 can be performed based on considering both: characteristic(s) of the query-responsive search result document(s) for the query; and degree(s) of overlap between the query and current context, recent context, and/or profile data (of the user associated with submission of the query at block 252). For instance, block 258 can be performed only when the query-responsive search result document(s) are of low quality and/or not diverse relative to one another, and the degree(s) of overlap satisfy threshold(s). Accordingly, performance of block 259 can be selective, and selective based on one or more objective criteria that seek to select implied-query-responsive SRDs only when doing so is likely to lead to generation of a more accurate and/or more appropriately specified NL based summary. In these and other manners, the efficiencies that can be achieved in generating and providing a more accurate NL based summary are balanced with the additional computational and/or network resources utilized in obtaining and/or processing the related-query-responsive SRDs.

In some implementations, block 259 includes sub-block 259A, in which the system determines whether to select an implied-query-responsive SRD, that is responsive to an implied query, for inclusion in the set based on measure(s)

of the implied-query-responsive SRD. The measure(s) of the implied-query-responsive SRD can include query-dependent measure(s) (for the implied query to which the implied-query-responsive SRD is responsive), query-independent measure(s) for the implied-query-responsive SRD, and/or user-dependent measure(s) for the implied-query-responsive SRD.

At block 260, the system generates an NL based summary based on processing, using an LLM, corresponding content from each of the SRD(s) of the set determined in block(s) 254, 256, 258, and/or 259. For example, if five search result documents are selected for the set, a corresponding portion of content from each of the five can be processed using the LLM to generate the NL based summary. The content of an SRD, that is processed using the LLM, can include all of the content of the document, such as text, image(s) (e.g., auto-generated caption(s) of image(s), text for detected object(s) in image(s), text in image(s)), and/or video(s) (e.g., transcription(s) thereof) of the document—or subset(s) of content of the document. It is noted that the search result documents that are selected for the set used in block 260 can include search result document(s) from block(s) 254, 256, 258, and/or 259. For example, in some implementations or iterations the set can include search result documents from only block 254. As another example, in some implementations or iterations the set can include search result documents from only blocks 254 and 259 (i.e., SRD(s) from block 254 and additional SRD(s) from block 259). As yet another example, in some implementations or iterations the set can include search result document(s) from each of blocks 254, 256, 258, and 259 (i.e., at least one corresponding search result document from each of those blocks).

In some implementations, the LLM that is utilized in generating the NL based summary can be one that is fine-tuned to a summary prompt. In some of those implementations, no prompt is processed using the LLM along with the corresponding content from each of the SRD(s) of the set. In some other implementations, the LLM may not be fine-tuned to a summary prompt and/or a summary prompt can be processed using the LLM and along with the corresponding content from each of the SRD(s) of the set. For example, a summary prompt such as "summarize the following content" can be processed using the LLM in advance of processing the corresponding content from each of the SRD(s) of the set.

In some implementations, the NL based summary that is generated can include direct quotes from the content that is processed using the LLM and/or can paraphrase the content that is processed using the LLM. In some implementations or situations, the NL based summary that is generated can also include content that is not directly (or even indirectly) derivable from the content processed using the LLM, but is relevant to the content and is generated based on world knowledge of the LLM (obtained through prior training). Accordingly, such content of the NL based summary will be influenced by the content processed using the LLM (including content from search result document(s)), but is generated based on world knowledge of the LLM and is not directly derivable from the content processed using the LLM. In these and other manners, the world knowledge benefits of the LLM are leveraged by the generated NL based summary, while generation of the NL based summary is constrained processing the content from search result document(s) using the LLM in the generation. In some implementations or situations, the NL based summary can include solely NL. In some implementations or situations, the NL based summary can additionally include additional content such as image(s) and/or video(s) (e.g., from SRD(s) of the set).

In some implementations, block 260 includes sub-blocks 260A and/or 260B.

At sub-block 260A, the system generates corresponding content from each SRD of the set determined in block(s) 256, 258, 259, and/or 260. For example, sub-block 260A can include further sub-block 260A1 in which the system generates the corresponding content for an SRD based on text, image(s), and/or video(s) of the SRD. For instance, the system can generate content that includes a snippet of text from the SRD as well as a caption of an image of the SRD. The snippet and/or the image can optionally be selected based on their correspondence to the query. For example, a snippet can be selected based on the snippet including one or more terms that are also included in the query, the snippet including one or more terms that are similar to term(s) included in the query, and/or a word embedding of the snippet being within a threshold distance of a word embedding of the query. In some implementations, at further sub-block 260A1 the system can optionally summarize the content and utilize the summarized content as the content that is processed using the LLM in generating the NL based summary. In some of those implementations, summarizing the content and utilizing the summarized content that is processed using the LLM enables the content, from the SRD and from other SRD(s) of the set, to be processed using the LLM (e.g., to conform to memory constraints of the LLM). In some versions of those implementations, the system only performs sub-block 260A1 in response to determining that the content fails to satisfy the memory constraints of the LLM. Put another way, the system can determine whether the content satisfies the memory constraints of the LLM and, if so, bypass sub-block 260A1 and, if not, then perform sub-block 260A1. In summarizing the content, the system can optionally process the content using a separate summarization LLM.

In some implementations, at further sub-block 260A1 the system can additionally or alternatively include, as part of the content, a source identifier of the SRD. For example, the source identifier can be a token included at the beginning and/or the end of the content. The token can be unique relative to other source identifier(s) for other SRD(s) of the set. The token can be descriptive of the underlying source document or can be non-descriptive thereof (e.g., it can be one of N default source identifiers such as S1, S2, S3, etc.). As described herein, in some implementations including the source identifier in the content can enable the LLM output, generated based on processing the content using the LLM, to reflect which portion(s) of the NL based summary are supported by which SRD(s).

At sub-block 260B, the system generates, based on processing the corresponding content using the LLM, LLM output that reflects the NL based summary. The NL based summary is generated based on the LLM output. In some implementations, the LLM output optionally additionally reflects source identifier(s) and/or confidence measure(s) associated with corresponding portion(s) of the NL based summary. As described herein, the source identifier(s) can be utilized in linkifying the corresponding portion(s). For example, a source identifier appearing before and/or after a portion of the NL based summary can indicate that the SRD, corresponding to the source identifier, verifies the portion. As a result, a link to the SRD can be provided in conjunction with the portion. As also described herein, the confidence measure(s) can be utilized in annotating confidence in corresponding portion(s) of the NL based summary and/or in the summary as a whole. For example, a portion with a high confidence measure can be annotated in a first color (e.g., green), a portion with a medium confidence measure can be annotated in a second color (e.g., orange), and a portion with a low confidence measure can be annotated in a third color (e.g., red). Also, for example, an NL based summary with a high confidence measure as a whole can be annotated with a "high confidence" descriptor, an NL based summary with a low confidence measure as a whole can be annotated with a "low confidence" descriptor, etc.

As also, described herein, the confidence measure(s) that are optionally reflected in the LLM output can be utilized in determining whether and/or how to provide the NL based summary. For example, if confidence measure(s) for portion(s) and/or a confidence measure for the NL based summary as a whole satisfies upper threshold(s) most indicative of confidence, the NL based summary can be rendered responsive to the query and without any initial rendering of any additional search results, such as those that correspond to search result documents (e.g., search result documents that are responsive to the query). For instance, rendering of any additional search results can be initially suppressed at a client device that submitted the query, or transmission of any additional search results to the client device can be initially suppressed. In such an instance, search results can optionally be rendered or transmitted only in response to satisfaction of one or more conditions, such as the user interacting with a selectable graphical user interface element that requests display of search results and/or passage of a threshold duration of time since rendering of the NL based summary (e.g., a fixed threshold duration of time, or one dynamically determined based on a length of the NL based summary). Accordingly, rendering and/or transmission of additional search results is selectively suppressed and a more concise (data wise and/or screen real estate wise) NL based summary instead provided. In these and other manners, network and/or computational efficiencies are achieved through selectively transmitting and/or rendering the NL based summary without any transmitting and/or rendering of the additional search results. As another example, if confidence measure(s) for portion(s) and/or a confidence measure for the NL based summary as a whole fails to satisfy upper threshold(s) most indicative of confidence but satisfies lower threshold(s) less indicative of confidence, the NL based summary can be rendered responsive to the query and with initial rendering of additional search results, such as those that correspond to search result documents (e.g., search result documents that are responsive to the query). As yet another example, if measure(s) for portion(s) and/or a confidence measure for the NL based summary as a whole fails to satisfy lower threshold(s) less indicative of confidence, transmission and/or rendering of the NL based summary can be suppressed completely, and only additional search results transmitted and rendered. Accordingly, rendering and/or transmission of the NL based summary is selectively suppressed when it fails to satisfy object conditions that indicate it is unlikely to be truly responsive to the query. In these and other manners, network and/or computational efficiencies are achieved through selective bypassing of transmitting and/or rendering the NL based summary.

At block 262, the system causes the NL based summary, generated at block 260, to be rendered in response to the query. For example, the system can cause the NL based summary to be rendered graphically in an interface of an application of a client device via which the query was submitted. As another example, the system can additionally or alternatively cause the NL based summary to be audibly rendered via speaker(s) of a client device via which the query was submitted.

In some implementations, the system causes the NL based summary to be rendered without any rendering of any additional search results. In some other implementations, the system additionally causes rendering of additional search result(s), such as those for the SRD(s) of the set that were used in generating NL based summary and/or those for other search result(s) (i.e., SRD(S) not included in the set). In some of the implementations that cause the NL based summary to be rendered without any rendering of any additional search results, the additional search results are optionally subsequently rendered in response to one or more subsequent conditions being detected by the system. For example, the conditions can include a passage of a threshold amount of time (static or dynamic) or detecting a user input that requests rendering of additional search results, such as a spoken utterance that request such rendering or a selection of a particular selectable graphical interface element. In some of the implementations that cause the NL based summary to be rendered without any rendering of any additional search results, transmission of the additional search results to the client device is suppressed, optionally only being transmitted in response to condition(s) being detected by the system.

In some implementations, block 262 includes sub-block 262A, sub-block 262B, and/or sub-block 262C.

At sub-block 262A, the system causes rendering of the NL based summary with link(s) to SRD(s) that verify portion(s) of the NL based summary. For example, link(s) to one or more SRD(s) of the set can optionally be provided as part of the NL based summary, and each of the links can be a corresponding general link to the SRD or a corresponding anchor link to a specific portion of the SRD (e.g., a portion of the SRD that verifies a corresponding portion of the NL based summary). For instance, a portion, of a visually rendered NL based summary, that is supported by a first SRD can be selectable (and optionally underlined, highlighted, and/or otherwise annotated). A selection of the portion can result in navigating to a link corresponding to the first SRD. Also, for instance, an icon or other graphical element corresponding to the first SRD can be visually rendered in conjunction with (e.g., presented immediately after) the portion of the NL based summary and can optionally be selectable to cause navigation to the link corresponding to the first SRD. As yet another instance, when multiple SRDs verify a portion of the NL based summary, a respective icon (or other graphical element) for each can be visually rendered in conjunction with the portion of the NL based summary and can optionally be selectable to cause navigation to a corresponding link for the corresponding SRD. For instance, if the portion is verified by a first SRD and a second SRD, a first icon for the first SRD and a second icon for the second SRD can be visually rendered immediately after the portion, the first icon can be selectable to cause navigation to a first link for the first SRD, and the second icon can be selectable to cause navigation to a second link for the second SRD. Providing the NL based summary with link(s) to SRD(s) that verify portion(s) of the NL based summary enables a user to quickly ascertain which portion(s) of the NL based summary are verifiable. Further, it enables a user to quickly (e.g., with a single tap, single click, or other single input) select a link to a SRD that verifies a portion, causing navigation the SRD (and optionally the portion) to quickly ascertain supporting and/or additional information relating to the portion.

At sub-block 262B, the system causes rendering of the NL based summary with confidence annotation(s). For example, a textual "high confidence", "medium confidence", or "low confidence" annotation can be annotated for the NL based summary as a whole. As another example, each of multiple portions of the NL based summary can be annotated with a corresponding color (or other annotation) that reflects a degree of confidence in that portion. Providing such confidence annotation(s) can enable a user to quickly ascertain veracity of the NL based summary and/or portion(s) thereof, and how much time to devote to reviewing the NL based summary and/or portion(s) thereof. Put another way, it can shorten the duration of the human-to-computer interaction.

At sub-block 262C, the system uses the LLM output and/or comparison(s) in (a) determining SRD(s) that verify portions of the NL based summary (for use in sub-block 262A) and/or in (b) determining confidence annotation(s) (for use in sub-block 262B).

For example, in determining that an SRD verifies a portion of an NL based summary, the system can use LLM output, such as LLM output that includes a source identifier for the SRD and that corresponds to the portion. As another example, in determining that an SRD verifies a portion of an NL based summary, the system can additionally or alternatively compare content of the portion to content of the SRD. For example, the system can compare an embedding of the portion of the NL based summary to an embedding of a portion of the SRD to determine a distance measure (e.g., in embedding space) and determine the SRD verifies the portion of NL based summary if the distance measure satisfies a threshold. For instance, the system can compare a text embedding, of a textual portion of the NL based summary, to a text embedding of a portion of the SRD, and determine whether a distance measure between the two text embedding satisfies a distance threshold.

As another example, in determining a confidence measure of a portion of an NL based summary (and a corresponding annotation to apply), the system can determine the confidence measure based on LLM confidence for that portion, as reflected in the LLM output, and/or based on underlying SRD(s) determined to verify that portion. For example the confidence measure of a portion can be based on trustworthiness of the SRD(s)) that verify that portion and/or a quantity of the SRD(s) that verify that portion. For instance, the confidence measure can reflect greater confidence when four SRDs verify that portion than when only one SRD verifies that portion. Also, for instance, the confidence measure can reflect greater confidence when four highly trustworthy SRDs verify that portion than when four less trustworthy SRDs verify that portion. Trustworthiness of an SRD can be directly reflected by a trustworthiness query-independent measure for the SRD or can be based on query-independent measure(s), query-dependent measure(s), and/or user-dependent measure(s) for the SRD that do not individually directly reflect trustworthiness.

As another example, in determining a confidence measure of the NL based summary as a whole (and a corresponding annotation to apply), the system can determine the confidence measure on LLM confidence for the NL based summary as a whole, as reflected in the LLM output, and/or based on confidence of all SRD(s) used in generating the NL based summary.

Figure 3:
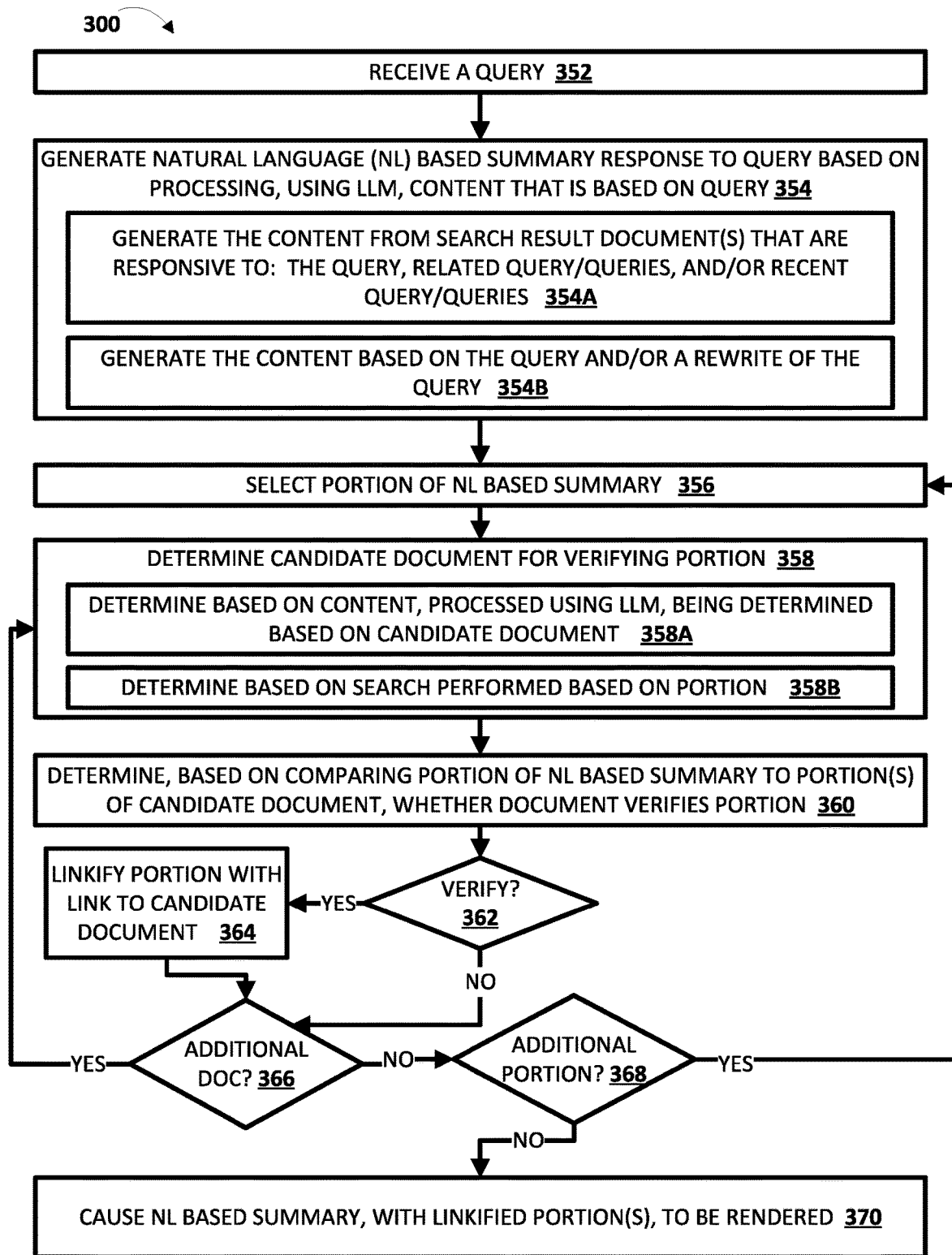
FIG. 3 depicts a flowchart illustrating an example method of selectively linkifying portion(s) of an NL based summary with link(s) to document(s) that verify the portion(s).

Turning now to FIG. 3, a flowchart is depicted that illustrates an example method 300 of selectively linkifying portion(s) of an NL based summary with link(s) to document(s) that verify the portion(s). For convenience, the operations of the method 300 are described with reference to a system that performs the operations. This system of the method 300 includes one or more processors, memory, and/or other component(s) of computing device(s) (e.g., client device 110 of FIG. 1, client device 810 of FIG. 8, and/or computing device 710 of FIGS. 7A1, 7A2, 7B1, 7B2, and 7B3, one or more servers, and/or other computing devices). Moreover, while operations of the method 300 are shown in a particular order, this is not meant to be limiting. One or more operations may be reordered, omitted, and/or added.

At block 352, the system receives a query. Block 352 can include one or more aspects in common with block 252 of method 200 of FIG. 2.

At block 354, the system generates an NL based summary response to the query based on processing, using an LLM, content that is based on the query. For example, the system can generate the NL based summary based on LLM output generated based on processing the content using the LLM. In some implementations, block 354 includes sub-block 354A or sub-block 354B.

At sub-block 354A, the system generates the content, that is processed using the LLM, from SRD(s) that are responsive to: the query of block 352, one or more related queries, and/or recent queries. In some implementations, sub-block 354A can include block 254 of method 200 of FIG. 2 and, optionally, block 256 and/or block 258 of method 200 of FIG. 2. In some of those implementations, block 354A can include block 260 of method 200 of FIG. 2.

At sub-block 354B, the system generates the content based on the query and/or a rewrite of the query. In some implementations, at sub-block 354B the content is generated independent of any SRD(s) that are responsive to: the query of block 352, one or more related queries, and/or recent queries. For example, the content can include only the query and/or the rewrite and, optionally, a prompt.

At block 356, the system selects a portion of the NL based summary. For example, the portion can be a sentence, a semantically coherent portion of a sentence, or an N character or N words span.

At block 358, the system determines a candidate document for verifying the portion of the NL based summary. In some implementations or iterations, block 358 includes sub-block 358A or sub-block 358B.

At sub-block 358A, the system determines the candidate document based on content, that is processed using the LLM in generating an NL based summary, being determined based on the candidate document. For example, sub-block 358A can be performed, in at least some iterations, when sub-block 354A is performed. Optionally, sub-block 358A is not performed when sub-block 354B is performed.

At sub-block 358B, the system determines the candidate document based on a search performed based on the portion of the NL based content. For example, the candidate document can be determined based on it corresponding to the top search result for such a search, or being in the top N search results. As another example, the candidate document can be determined based on other measure(s) for the document, such as query-dependent, query-independent, and/or user-specific measure(s) described herein.

At block 360, the system determines, based on comparing the portion of the NL based summary to portion(s) of the candidate document, whether the document verifies the portion of the NL based summary. For example, in comparing the portion of content to the document content the system can: process a portion of the NL based content, using an encoder model, to generate a content embedding of the portion; processing document content of the candidate document, using the encoder model, to generate a document content embedding; and compare the content embedding to the document content embedding. Further, in determining whether the document verifies the portion of the NL based content the system can determine a distance measure between the content embedding and the document content embedding and determining, based on the distance measure, whether the document verifies the portion of the NL based content (e.g., verifies only if distance measure is less than a threshold).

At block 362, the system proceeds to block 364 if it is determined the document verifies the portion of the NL based content, and proceeds to block 366 if not.

At block 364, the system linkifies the portion with a link to the candidate document. For example, the system can associate the portion with the link so that, when the NL based content is rendered, a selectable version of the link is rendered at the client device as corresponding to the portion. The link to the candidate document can be a general link to the candidate document or a corresponding anchor link (or other specific link) to a portion of the candidate document. The specific link can be to the portion of the candidate document based on the portion of the candidate document being determined, at block 360, to be the portion that verifies the portion of the NL based content.

At block 366, the system determines whether there are additional candidate documents to process for the portion. For example, if a document has already been determined to verify the portion, the decision at block 366 can be "no". As another example, if N documents have already been processed for the portion, the decision at block 366 can be "no". It is noted that in some implementations, the decision at block 366 can be "yes" even when a document has already been determined to verify the portion. In those implementations, a portion can be linkified with links to multiple candidate documents. For example, the portion can be linkified with a first link to a first candidate document in one iteration of block 364 for the portion and the portion can be linked with a second document in another iteration of block 364 for the portion. If the decision at block 366 is "yes", the system returns to block 358 and determines an additional candidate document for the portion.

If the decision at block 366 is "no", the system proceeds to block 368 and determines whether there are any unprocessed portion(s) of the NL based summary. If so, the system proceeds to block 356 and selects an additional unprocessed portion. If not, the system proceeds to block 370.

At block 370, the system causes the NL based summary, with the linkified portion(s) (if any were linkified in block 364) to be rendered. In some implementations, at block 370 the system causes the NL based summary, with the linkified portion(s) (if any were linkified in block 364) to be rendered in response to the query of block 352. For example, when the NL based summary is rendered in response to the query, the system can cause a selectable link, to a corresponding document, to be rendered as corresponding to a corresponding linkified portion. For instance, the link can be rendered as corresponding to the linkified portion based on being rendered as a selectable icon following the linkified portion and the linkified portion being highlighted (or otherwise annotated). As another instance, the link can be rendered as corresponding to the linkified portion based on the linkified portion being a hyperlink for the link.

For ease in explanation, iterations of blocks 356, 358, 360, 362, 364, 366, and 368 are illustrated as being performed in serial. However, it is noted that in various implementations multiple candidate documents for a given portion and/or multiple portions can be processed in parallel.

Figure 4:
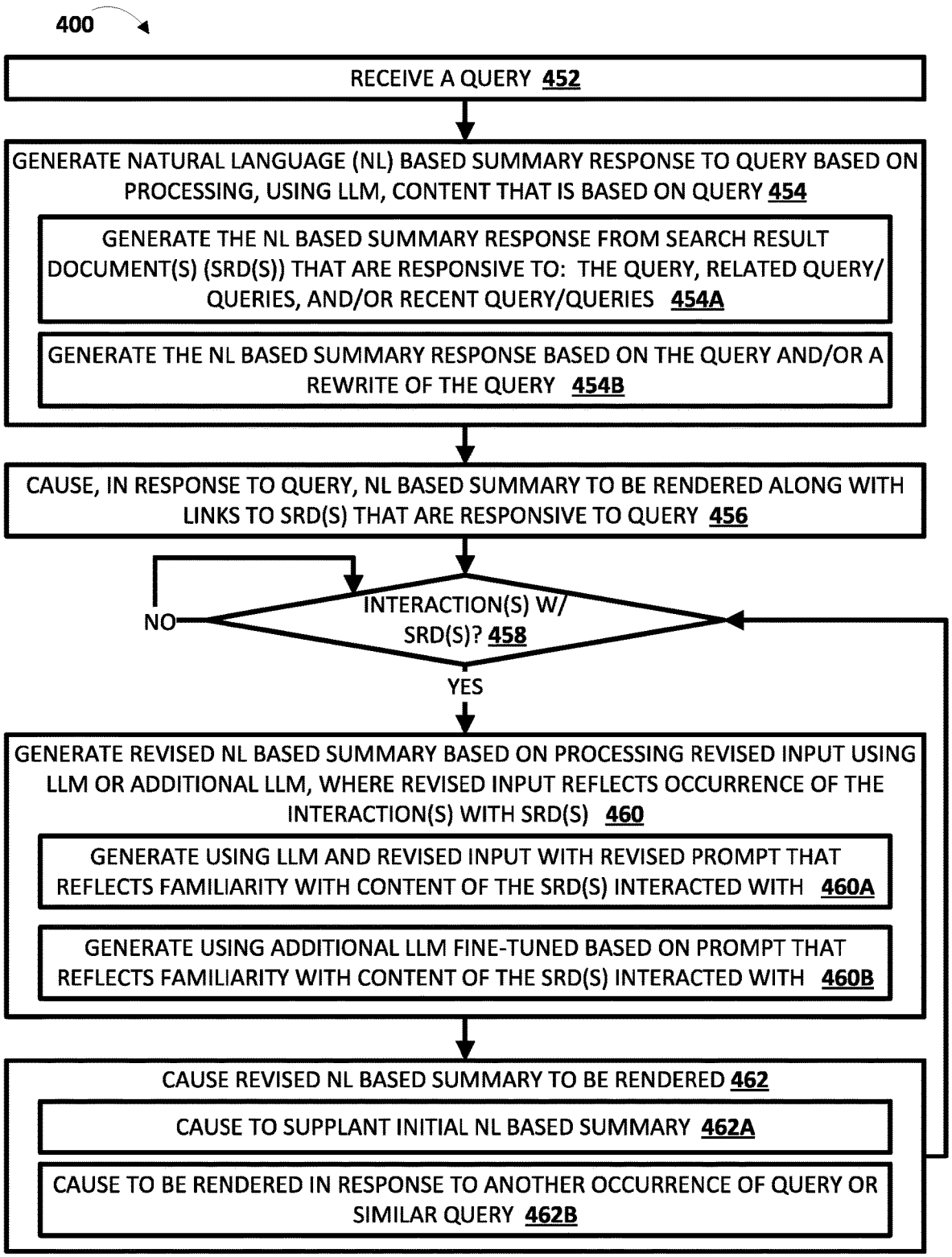
FIG. 4 depicts a flowchart illustrating an example method of generating, using an LLM, a revised NL based summary response to a query, where the revised NL based summary response is generated in response to user interaction with search result document(s) that are responsive to the query.

Turning now to FIG. 4, a flowchart is depicted that illustrates an example method 400 of generating, using an LLM, a revised NL based summary response to a query, where the revised NL based summary response is generated in response to user interaction with search result document(s) that are responsive to the query. For convenience, the operations of the method 400 are described with reference to a system that performs the operations. This system of the method 400 includes one or more processors, memory, and/or other component(s) of computing device(s) (e.g., client device 110 of FIG. 1, client device 810 of FIG. 8, and/or computing device 710 of FIGS. 7A1, 7A2, 7B1, 7B2, and 7B3, one or more servers, and/or other computing devices). Moreover, while operations of the method 400 are shown in a particular order, this is not meant to be limiting. One or more operations may be reordered, omitted, and/or added.

At block 452, the system receives a query. Block 452 can include one or more aspects in common with block 252 of method 200 of FIG. 2.

At block 454, the system generates an NL based summary response to the query based on processing, using an LLM, content that is based on the query. For example, the system can generate the NL based summary based on LLM output generated based on processing the content using the LLM. In some implementations, block 454 includes sub-block 454A or sub-block 454B.

At sub-block 454A, the system generates the content, that is processed using the LLM, from SRD(s) that are responsive to: the query of block 452, one or more related queries, and/or recent queries. In some implementations, sub-block 454A can include block 254 of method 200 of FIG. 2 and, optionally, block 256 and/or block 258 of method 200 of FIG. 2. In some of those implementations, block 454A can include block 260 of method 200 of FIG. 2.

At sub-block 454B, the system generates the content based on the query and/or a rewrite of the query. In some implementations, at sub-block 454B the content is generated independent of any SRD(s) that are responsive to: the query of block 452, one or more related queries, and/or recent queries. For example, the content can include only the query and/or the rewrite and, optionally, a prompt.

At block 456, the system causes, in response to the query, the NL based summary to be rendered (i.e., at the client device that submitted the query and/or a related client device), along with links to search result documents that are responsive to the query. In some implementations, some or all of the links are rendered separate from the NL based summary, such as links in traditional search results. In some implementations, some or all of the links are rendered as part of the NL based summary. For example, the links can be rendered as part of the NL based summary utilizing method 300 of FIG. 3 or block 262A of method 200 of FIG. 2. In some implementations, the NL based summary is initially rendered without any rendering of the links as described herein. In some of those implementations, the links are thereafter rendered in response to detecting occurrence of one or more conditions such as those described herein.

At block 458, the system monitors for interaction(s) with any of the search result document(s) that are responsive to the query. For example, the system can determine an interaction with a search result document based on determining a selection of the corresponding link, optionally along with determining a threshold duration of dwell time at the search result document and/or other threshold interaction measure(s) with the search result document. As another example, the system can determine an interaction with a search result document based on determining that a corresponding search result document, for the search result, has been reviewed (without necessarily clicking through to the underlying search result document). For instance, the system can determine an interaction with a search result based on pausing of scrolling over the search result, expanding of the search result, highlighting of the search result, and/or other factor(s).

The system proceeds to block 460 when an interaction with search result document(s) is determined at block 458. At block 460, the system generates a revised NL based summary based on processing revised input using the LLM or an additional LLM. The revised input reflects the occurrence of the interaction(s) with the search result document(s), and is revised relative to the input that is processed, using the LLM, in block 454. The revised input can reflect familiarity with content of the search result document(s) interacted with and, as a result, the revised NL based summary will be updated in view of that familiarity. For example, the revised NL based summary can omit content of the search result document(s) interacted with (whereas the NL based summary of block 454 included it), or the revised NL based summary can include a more in depth discussion of the content of the search result document(s) interacted with (whereas the NL based summary of block 454 included only a high level overview of the content). In these and other manners, the revised NL based summary guides the human-to-computer interaction by being updated to reflect interaction(s) with SRD(s) that occurred thus far in the interaction. Accordingly, the system guides the user, through the revised NL based summary, to additional information that facilitates the user accomplishing their task, where the additional information accounts for the interaction(s) with SRD(s) that have already occurred during the human-to-computer interaction.

In some implementations, block 460 includes sub-block 460A or sub-block 460B.

At sub-block 460A, the system generates the revised NL based summary using the same LLM as used in block 454, but using a revised input with a revised prompt that reflects familiarity with the content of the SRD(s) interacted with. For example, the prompt used in block 454 could be "create a summary of the following", whereas the prompt used in sub-block 460A could be "create a summary of the following and assuming the user already knows X", where "X" is a description of the content of the SRD(s) interacted with. In some implementations, the system can generate the description "X" to conform to some or all of the content of the SRD(s) interacted with. For example, if the user hovered over a snippet in a search result, the description "X" can conform to that snippet. In some implementations, the system can generate the description "X" using an LLM (e.g., the same LLM as used in block 454 or a separate LLM). For example, the system can process "create a summary of [content]" using the LLM (where "[content]" reflects the content interacted with), and generate the description "X" based LLM output generated based on such processing.

At sub-block 460B, the system generates the revised NL based summary using an additional LLM, relative to the one used in block 454, that is fine-tuned based on a prompt that reflects familiarity with content of the SRD(s) interacted with. For example, the fine-tuned LLM model can be trained to receive known content that the user already knows, followed by (e.g., after a delimiter) additional content to be summarized in view of the known content. For instance, the known content portion of the input can be based on content from the given search result. The system can generate the known portion of the input using, for example, one of the techniques described in the previous paragraph relative to determining the description "X".

At block 462, the system causes the revised NL based summary, generated at block 460, to be rendered (i.e., at the client device that submitted the query and/or a related client device). Following block 462, the system optionally proceeds back to block 458 and monitors for additional interaction(s) with additional search result document(s) that are responsive to the query and, if such additional interaction(s) are detected, proceeds to block 460 to generate a further revised NL based summary by processing additional revised input reflects such additional interaction(s) (and prior interaction(s) of prior iteration(s) of block 458). In some implementations, block 462 can include sub-block 462A and/or sub-block 462B.

At sub-block 462A, the system causes the revised NL based summary to supplant the initial NL based summary. For example, after interaction with the SRD(s), the client device can navigate back to the interface where the initial NL based summary was displayed, but it can be supplanted with the revised NL based summary. As another example, the initial NL based summary can continue to be displayed (e.g., in a sidebar, a separate window, or a separate screen) during interaction with the SRD(s) and, during or following the interaction, can be supplanted with the revised NL based summary. When the revised NL based summary supplants the initial NL based summary, an audible and/or visual cue can optionally be provided to draw the user's attention to the supplanting. For example, the revised NL based summary can be at least initially provided with highlighting to draw the user's attention.

At sub-block 462B, the system causes the revised NL based summary to be rendered in response to another occurrence of the query or a similar query. For example, after interaction with the SRD(s), the user may submit the same query again (e.g., minutes, hours, or days later), and the revised NL based summary can be rendered responsive to the additional submission of the same query and in lieu of rendering of the NL based summary of block 454.

It is noted that implementations of method 400 enable an NL based summary for a query to evolve as a user interacts with search results for the query, thereby guiding the user-to-computer interaction to direct the user to additional facets of the query and/or to a more complete understanding of the information and/or task(s) sought by the query. The evolution of the summary can be achieved in a manner that is transparent to the user without requiring any specific user input, other than interaction with the SRDs, to trigger the evolution of the summary.

Figure 5:
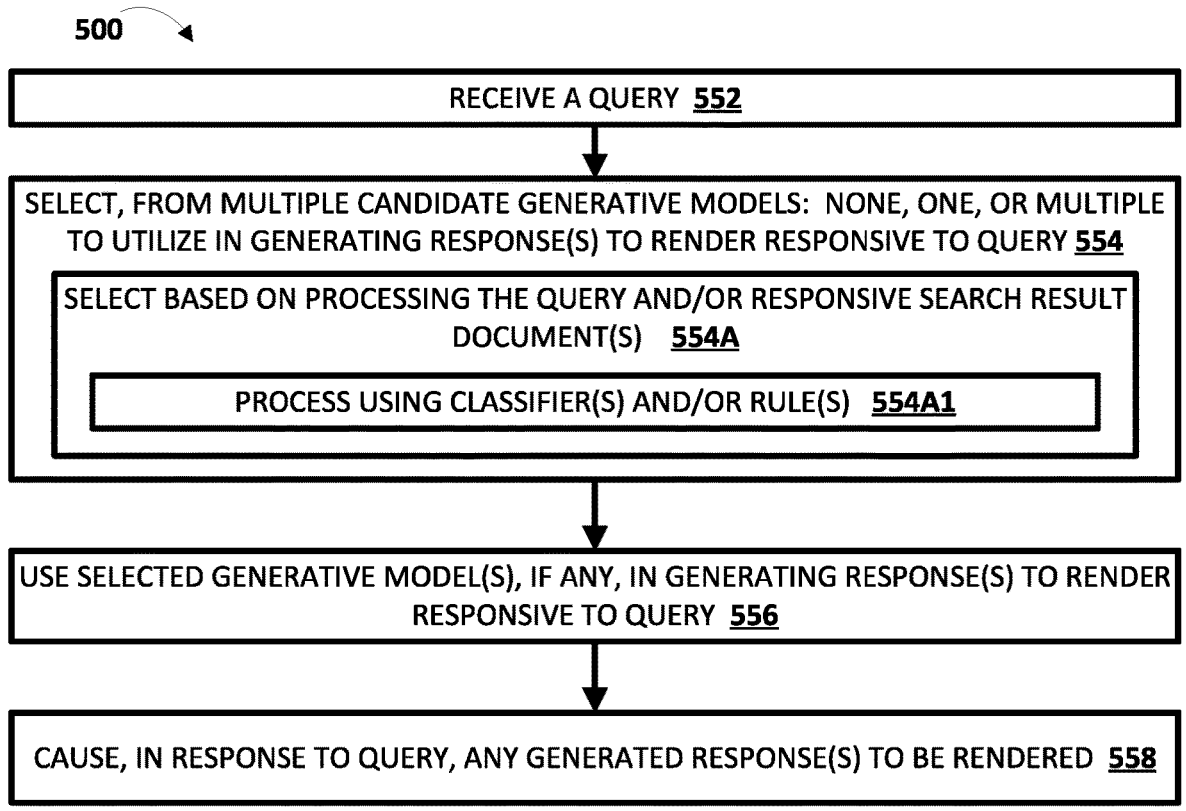
FIG. 5 depicts a flowchart illustrating an example method of selecting none, one, or multiple generative model(s) to utilize in generating response(s) to render responsive to a query, and using the selected generative model(s), if any, in generating response(s) to the query.

Turning now to FIG. 5, a flowchart is depicted that illustrates an example method 500 of selecting none, one, or multiple generative model(s) to utilize in generating response(s) to render responsive to a query, and using the selected generative model(s), if any, in generating response(s) to the query. For convenience, the operations of the method 500 are described with reference to a system that performs the operations. This system of the method 500 includes one or more processors, memory, and/or other component(s) of computing device(s) (e.g., client device 110 of FIG. 1, client device 810 of FIG. 8, and/or computing device 710 of and/or computing device 710 of FIGS. 7A1, 7A2, 7B1, 7B2, and 7B3, one or more servers, and/or other computing devices). Moreover, while operations of the method 500 are shown in a particular order, this is not meant to be limiting. One or more operations may be reordered, omitted, and/or added.

At block 552, the system receives a query. Block 552 can include one or more aspects in common with block 252 of method 200 of FIG. 2.

At block 554, the system selects, from multiple candidate generative models: none, one, or multiple to utilize in generating response(s) to render responsive to the query. For example, in some iterations the system will determine to not utilize any of the candidate generative models, in some iterations the system will determine to utilize only one of the candidate generative models, and in some iterations the system will determine to utilize multiple of the candidate generative models. For instance, in some iterations the system will determine to not utilize any of the candidate generative models based on one or more objective criteria indicating that such utilization is not needed to satisfy the needs of the query, thereby conserving resources that would otherwise be consumed by utilization of the generative model(s).

As a working example, assume the candidate generative models include: an informational LLM for generating informational summaries for a query; a creative LLM for generating creative poems, essays, or other prose based on a query; and a text-to-image diffusion model for creating a synthetic image based on a query. In some implementations, the creative LLM and the informational LLM can be two truly different LLMs, such as an informational LLM fine-tuned to a summary prompt and a creative LLM fine-tuned to a prompt that corresponds to the query (e.g., a "writing" LLM if query includes "write me an essay about" or "write me a poem about). In some other implementations, the creative LLM and the informational LLM can be the same LLM, but prompted differently (e.g., prompt with "summarize the following passages" if informational; prompt based on query (or rewrite) if creative). The multiple candidate generative models can include additional and/or alternative models, such as a larger size LLM and a smaller size LLM. The larger size LLM can be more robust and/or more accurate than the smaller size LLM, but requires more computational resources (e.g., memory and/or processor resources) to utilize. By dynamically adapting the LLM selection based on the task at hand, the use of computational resources can be optimized, for example by favoring smaller LLMs if a larger LLM is not required to achieve a requirement specification of a given task.

Block 554 can include sub-block 554A, in which the system makes the selection of block 554 based on processing the query and/or based on processing responsive search result document(s) that are responsive to the query. Sub-block 554A can include sub-block 554A1 in which the system uses a classifier and/or rules in the processing of sub-block 554A.

For example, the system can process content of the query using a machine learning classifier to classify the query into one or more classifications, and the generative model(s) corresponding to those classification(s) can be determined to be most appropriate. For example, the query can be processed using a classifier to classify the query among the generative models (e.g., as one of informational, creative, or synthetic image). As another example, the system can additionally or alternatively utilize a rule that specifies classification(s) that vary in dependence on presence and/or absence of certain words. As yet another example, for a voice query, the system can additionally or alternatively utilize voice characteristic(s) of the query to classify the query among the generative models. As another example, the system can additionally or alternatively utilize SRD(s), that are responsive to the query, to classify the query among the generative models. For example, if the top N result(s) include certain type(s) of results and/or result(s) that include certain type(s) of content, the system can determine an informational LLM should be used. As another example, if top N result(s) include certain other type(s) of results and/or result(s) that include certain other type(s) of content, the system can determine a creative LLM and a text-to-image diffusion model should be used. As yet another example, the system can consider the quality and/or trustworthiness of SRD(s). As yet another example, for "close calls" (e.g., based on classifier output(s)) and/or in other situations, the system can select multiple generative models that correspond to the "close calls"—or for "close calls" and/or in other situations (e.g., search result(s) for the query are high quality), the system can determine to select no generative model(s) for use in generating responses.

At block 556, the system uses the selected generative model(s) (selected at block 554), if any, in generating response(s) to render responsive to the query. For example, if only an informational LLM is selected, an NL based summary response can be generated using the informational LLM. As another example, if both the creative LLM and the text-to-image diffusion model are selected, a creative prose response can be generated using the creative LLM and a synthetic image response can be generated using the text-to-image diffusion model. Various techniques disclosed herein can be utilized in generating a response utilizing the selected generative model(s). For example, the query can be processed using a selected generative model to generate a response and/or additional content (e.g., content from search result(s) responsive to the query and/or other queries, such as related queries) can be processed using the selected generative model to generate the response.

At block 558, the system causes, in response to the query, any generated response(s) (generated at block 556) to be rendered (i.e., at the client device that submitted the query and/or a related client device). The response(s) can optionally be rendered along with additional search results for the query, such as those not generated utilizing any of the candidate generative models.

Figure 6:
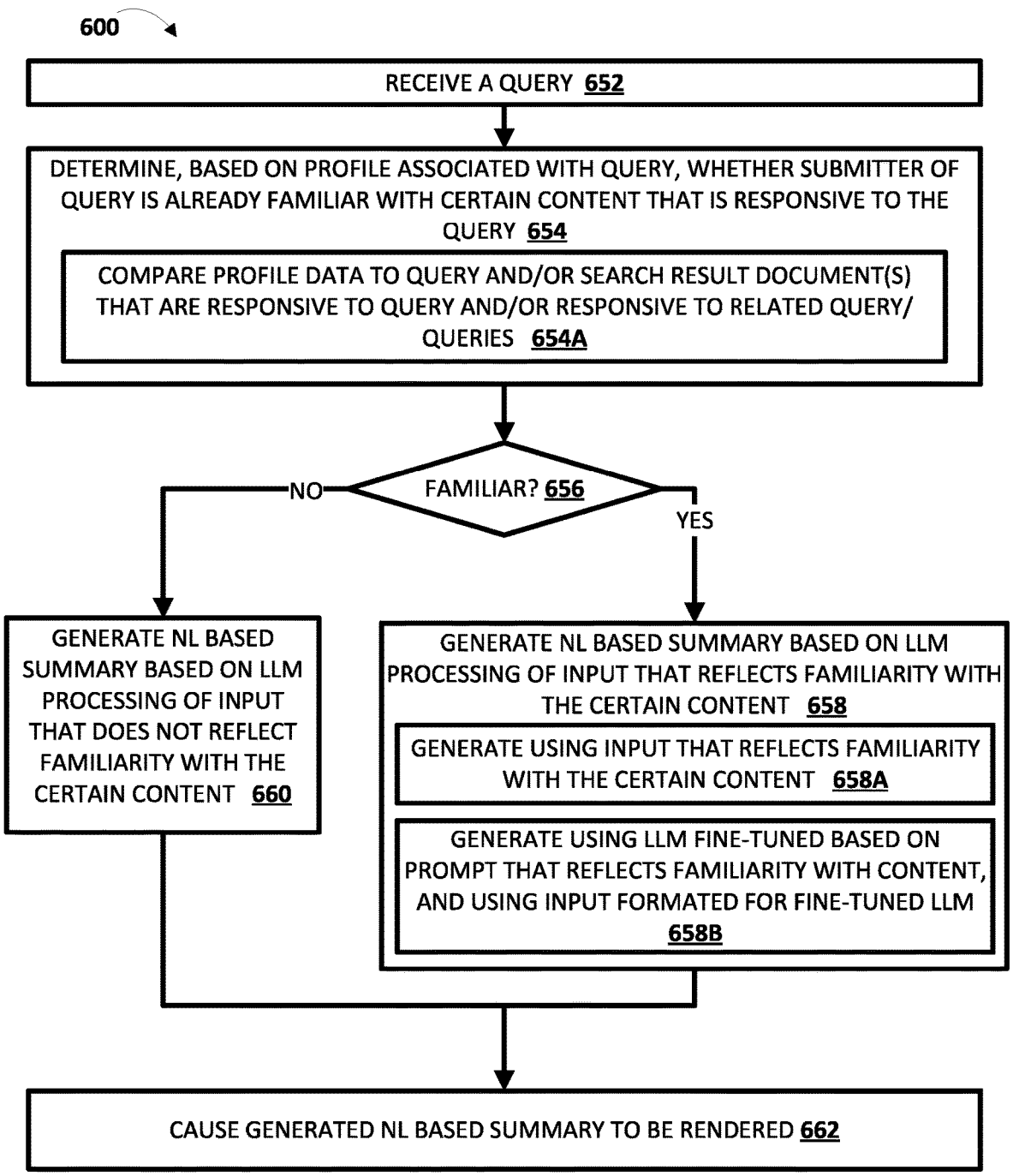
FIG. 6 depicts a flowchart illustrating an example method of generating, using an LLM, an NL based summary in dependence on whether a submitter of the query is already familiar with certain content that is responsive to the query.

Turning now to FIG. 6, a flowchart is depicted that illustrates an example method 600 of generating, using an LLM, an NL based summary in dependence on whether a submitter of the query is already familiar with certain content that is responsive to the query. For convenience, the operations of the method 600 are described with reference to a system that performs the operations. This system of the method 600 includes one or more processors, memory, and/or other component(s) of computing device(s) (e.g., client device 110 of FIG. 1, client device 810 of FIG. 8, and/or computing device 710 of FIGS. 7A1, 7A2, 7B1, 7B2, and 7B3, one or more servers, and/or other computing devices). Moreover, while operations of the method 600 are shown in a particular order, this is not meant to be limiting. One or more operations may be reordered, omitted, and/or added.

At block 652, the system receives a query. Block 652 can include one or more aspects in common with block 252 of method 200 of FIG. 2.

At block 654, the system determines, based on a profile associated with the query (e.g., a device profile of the client device via which the query was submitted and/or a user profile of the submitter), whether the submitter of the query is already familiar with certain content that is responsive to the query. Block 654 can include sub-block 654A. At sub-block 654A, the system, in determining whether the submitter of the query is already familiar with the certain content, compares profile data, of the profile, to the query and/or to search result document(s) that are responsive to the query and/or to one or more related queries. For example, the system can determine that the user is already familiar with the certain content if the comparison indicates the user has already interacted with search result document(s) having the certain content and/or has profile data that directly indicates familiarity with the certain content.

At block 656, the system determines to proceed to block 660 if the system determined at block 654 that the user is not familiar with the certain content, and determines to proceed to block 658 if the system determined at block 654 that the user is familiar with the certain content.

At block 660, the system generates an NL based summary based on LLM processing of input that does not reflect familiarity with the certain content.

At block 658, the system generates an NL based summary based on LLM processing of input that reflects familiarity with the certain content. Block 658 can include sub-block 658A or sub-block 658B.

At sub-block 658A the system generates the NL based summary using input that reflects familiarity with the certain content, such as input that includes a prompt of "assuming the user is familiar with [description of the certain content] give me a summary of [query]".

At sub-block 658B, the system generates the NL based summary using an LLM fine-tuned based on a prompt that reflects familiarity with the content, and using input formatted for the fine-tuned LLM. For example, the fine-tuned LLM model can be trained to receive known content that the user is already familiar with, followed by (e.g., after a delimiter) additional content to be summarized in view of the known content.

At block 662, the system causes the generated NL based summary to be rendered. The generated NL based summary can be one generated in block 660 or one generated in block 658.

In some implementations, after performing block 662, the system can proceed to block 458 of method 400 of FIG. 4. Further, if interaction(s) with SRD(s) are determined at block 458 of method 400 of FIG. 4, the system can further proceed to blocks 460 and 462 of FIG. 4. Put another way, the techniques of FIG. 4 and FIG. 6 can be combined in some implementations. In those implementations, this enables an initially generated NL based summary for a query to be selectively generated based on familiarity of a user with certain content that is responsive to the query and, further, enables a revised NL based summary for the query to be generated responsive to further interaction(s) with search result document(s). For example, an initially generated NL based summary can be generated with a prompt that reflects familiarity with content X (but not content Y), based on a profile indicating the user is already familiar with content X. Further, the user can thereafter interact with search result document(s) that relate to content X and, in response, a revised NL based summary can be generated with a prompt that reflects familiarity with content X and with content Y.

FIG. 7A1 depicts an example client device 710 with a display 780 rendering, in response to a query 782, a graphical interface that includes an example NL based summary 784 and additional example search results 788 that are responsive to the query 782. In the NL based summary 784, there are three linkified portions, each indicated by underlining and a source identifier (S1, S2, S3) provided immediately following the linkified portions. Each linkified portion, and its source identifier, is selectable to cause navigation to a corresponding search result document that verifies the linkified portion. Further, in FIG. 7A1 there is an expansion element 786 displayed that, when selected, reveals search results for the search result document(s) that verify the linkified portions of the NL based summary 784.

Three example search results 788 are illustrated in FIG. 7A1 below the NL based summary 784. The three search results 788 can be, for example, the top 3 search results for the query 782. Additional search results can be provided (e.g., by scrolling down) or, in some implementations, search results 788 can be omitted or only shown in response to a user scrolling, selecting an interface element, or providing other input(s). It is noted that, in the example of FIG. 7A1, the search results 788 correspond to search result documents that are distinct from the search result documents that correspond to the source identifiers (S1, S2, S3) that verify linkified portions of the NL based summary 784. For example, and as illustrated in FIG. 7A2, the search result documents that correspond to the source identifiers (S1, S2, S3) are associated with uniform resource locators (URLs) that differ from those of the search results 788. Search result(s), that correspond to the search result documents that correspond to the source identifiers (S1, S2, S3), can optionally be included among additional search results provided by e.g., scrolling down—or could even be included among the top 3 search results in various situations.

FIG. 7A2 depicts the example client device 710, after a user has interacted with the expansion element 786 of FIG. 7A1 to reveal search results 787 for the search result document(s) that verify the linkified portions of the NL based summary. A contraction element 786A is also illustrated that, when selected, causes the interface to revert back to its FIG. 7A1 state.

FIG. 7B1 depicts a non-limiting alternative to the graphical interface of FIG. 7A1. Like in FIG. 7A1, in FIG. 7B1 the display 780 is rendering, in response to a query 782, a graphical interface that includes the example NL based summary 784. The display 780 is also rendering the expansion element 786 of FIG. 7A1. However, notably, the display 780 in FIG. 7B1 is not rendering any additional search results that are responsive to the query 782, whereas additional example search results 788 are rendered in FIG. 7A1. However, an additional expansion element 787 is rendered in FIG. 7B1 that, when selected, will cause such additional search results to be rendered. Determining to display the NL based summary 784, without initial simultaneous display of any search results, as in FIG. 7B1, can be based on various considerations such as those disclosed herein.

FIG. 7B2 depicts the example client device 710 interacting with a search result document 783, that is responsive to the query of FIG. 7B1, after the example NL based summary of FIG. 7B1 was rendered. More particularly, as reflected in URL bar 791, the client device has navigated to "www.exampleurl7.com", which is associated with source identifier S2. For example, the client device 710 can navigate to that URL in response to a selection, of the linkified portion of the NL based summary 784 in FIG. 7B1 (i.e., the linkified portion of "lower rates of heart disease, diabetes, and kidney disease (S2)"). the FIG. 7B3 depicts the example client device 710 rendering a graphical interface that includes an example revised NL based summary 784', generated based on the interaction with the search result document 783 of FIG. 7B2. For example, the revised NL based summary 784' can be rendered after the user has viewed the search result document 783 (optionally for at least a threshold duration of time), and optionally after the user has navigated back to a search results page. The revised NL based summary 784' differs from the NL based summary 784 of FIG. 7B1. For example, it includes different text and, further, includes a linkified portion (with source identifier S4) that is not included in the NL based summary 784.

The revised NL based summary 784' can be generated by processing, using an LLM, revised input that reflects occurrence of interaction with the search result document 783. Further, it can be generated in response to the interaction with the search result document 783. In contrast, the NL based summary 784 of FIG. 7B1 can be generated by processing, using the LLM (or an additional LLM), other input that does not reflect occurrence of the interaction with the search result document 783—based on the interaction with the search result document 783 not having yet occurred at the time of the generation of the NL based summary 784.

In some implementations disclosed herein, multiple LLMs are utilized in parallel in generating an NL based summary responsive to a query. For example, each of the multiple LLMS can be utilized to generate a corresponding candidate NL based summary, but only one of the candidate NL based summaries selected for use (e.g., for rendering in response to the query). For instance, one can be selected for use based on it (a) being similar to the greatest quantity of other candidate NL based summaries, (b) being similar to at least a threshold quantity of other candidate NL based summaries, (c) lacking certain content (e.g., certain term(s)), (d) including certain content (e.g., certain term(s)), (d) having the highest language model score, (e) having a language model score that satisfies a threshold, and/or (f) having or lacking other feature(s).

In some versions of those implementations, one or more of the LLMs that are utilized in parallel can be truly different from other of the LLM(s). For example, a first of the LLMs can be trained and/or fine-tuned differently than a second of the LLMs. Also, for example, each of the LLMs can be trained and/or fine-tuned differently than all other of the LLMs. As another example, a first of the LLMs can have a first architecture that differs from a second architecture of a second of the LLMs. In some additional or alternative versions of those implementations, two or more (e.g., all) of the LLMs that are utilized in parallel are the same (e.g., architecturally, training, and/or fine-tuning wise), but different content is processed among the two or more LLMs. For example, first search result document(s) can be processed using a first LLM and second search result document(s) can be processed using a second LLM. As another example, a first subset of content from first search result document(s) can be processed using a first LLM and a second subset of content from the first search result document(s) can be processed using a second LLM. As yet another example, a first prompt can be processed (along with additional content) using a first LLM and a second prompt can be processed (optionally along with the same additional content) using a second LLM. Utilizing multiple LLMs in parallel for a given query, while optionally selecting a candidate NL based summary from only one, can mitigate occurrences of the selected candidate NL based summary being difficult to parse, inaccurate, or otherwise not resonating with a user. Put another way, running multiple LLMs in parallel can leverage that different LLMs may perform better in some situations than others, and enables utilizing output from the LLM that is best suited for the current situation.

In some implementations disclosed herein, multiple LLMs are utilized in series in generating an NL based summary responsive to a query. As one example, first LLM(s) can be used to select passages from a set of search result document(s) (e.g., utilized in block 260A of method 200 of FIG. 2). Second LLM(s) can then be used to generate a summary for each of the passage(s) selected utilizing the first LLM(s) (e.g., utilized in block 260A1 of method 200 of FIG. 2). Further, third LLM(s) can then generate an overall NL based summary based on the individual passage summaries generated using the second LLM(s) (e.g., utilized in block 260B of method 200 of FIG. 2).

In some implementations, a user can specify, as part of a query or via interface element(s) in conjunction with a query (e.g., selectable interface element(s) provided near a query input field), desired formatting option(s) for an NL based summary. For example, a desired formatting option could be "list format", "graph format", "top 5", "in the style of", etc. For instance, a query could be "how to draft a patent, in list format" or "how to draft a patent, in the style of a layperson", etc. In some versions of those implementations, the specified format can be used to select, from plurality of fine-tuned LLMs for each format, a fine-tuned LLM for the selected format. For example, if "list format" is specified, an LLM that is fine-tuned on a list format prompt can be selected as the LLM to utilize in generating a NL based summary according to implementations disclosed herein. In some additional or alternative versions, the specified format can be used to adapt a prompt for an LLM. For example, if "graph" format is specified, a prompt provided to the LLM in generating the NL based summary can be e.g., "summarize the following information in graph format".

Client device 710 can include various user interface components including, for example, microphone(s) to generate audio data based on spoken utterances and/or other audible input, speaker(s) to audibly render synthesized speech and/or other audible output, and/or the display 780 to visually render visual output. Further, the display 780 of the client device 710 can include various system interface elements (e.g., hardware and/or software interface elements) that may be interacted with by a user of the client device 710 to cause the client device 710 to perform one or more actions. The display 780 of the client device 710 enables the user to interact with content rendered on the display 780 by touch input (e.g., by directing user input to the display 780 or portions thereof (e.g., to a query entry box), to a keyboard (not depicted), or to other portions of the display 780)) and/or by spoken input (e.g., by selecting microphone interface element— or just by speaking without necessarily selecting a microphone interface element). Although the client device 710 depicted in FIG. 7 is a mobile phone, it should be understood that is for the sake of example and is not meant to be limiting. For example, the client device 710 may be a standalone speaker with a display, a standalone speaker without a display, a home automation device, an in-vehicle system, a laptop, a desktop computer, and/or any other device.

Figure 8:
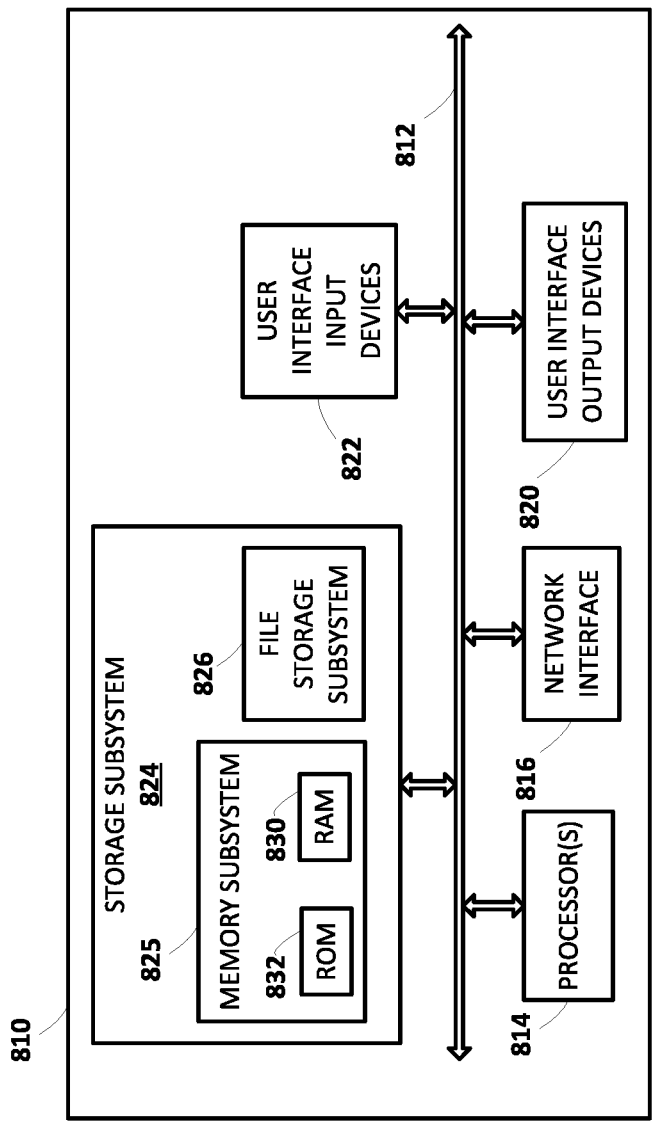
FIG. 8 depicts an example architecture of a computing device, in accordance with various implementations.

Turning now to FIG. 8, a block diagram of an example computing device 810 that may optionally be utilized to perform one or more aspects of techniques described herein is depicted. In some implementations, one or more of a client device, cloud-based automated assistant component(s), and/or other component(s) may comprise one or more components of the example computing device 810.

Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the methods disclosed herein, as well as to implement various components depicted in FIG. 1.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem 812 may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes In some implementations, a method implemented by processor(s) is provided and includes receiving a query associated with a client device (e.g., a query submitted based on user interface input at the client device, or a query submitted automatically by the client device or by a server on behalf of the client device). The method further includes selecting a set of search result documents. Selecting the set of search result documents includes selecting, for inclusion in the set, a plurality of query-responsive search result documents based on the query-responsive search result documents being responsive to the query. The method further includes generating large language model (LLM) output based on processing, using an LLM, corresponding content from each of the search result documents of the set. The method further includes generating a natural language (NL) based summary using the LLM output, and causing the NL based summary to be rendered at the client device in response to the query.

In some implementations, selecting, for inclusion in the set, the query-responsive search result documents includes selecting the query-responsive search result documents from a superset of search result documents that are responsive to the query, and based on one or more corresponding features of each of the query-responsive search result documents. In some versions of those implementations, the one or more corresponding features of each of the query-responsive search result documents include one or more query-dependent measures for the query-responsive search result document, one or more query-independent measures for the query-responsive search result document, and/or one or more user-dependent measures for the query-responsive search result document. In some of those versions, the one or more query-dependent measures for the query-responsive search result document can include a positional ranking of the query-responsive search result document and for the query, a selection rate of the query-responsive search result document and for the query, a locality measure that is based on an origination location of the query and a location corresponding to the query-responsive search result document, and/or a language measure that is based on a language of the query and a language corresponding to the query-responsive search result document. In some of those versions, the one or more query-independent measures for the query-responsive search result document include a selection rate of the query-responsive search result document for multiple queries, a trustworthiness measure for the query-responsive search result document, an overall popularity measure for the query-responsive search result document, and/or a freshness measure that reflects recency of creation or updating of the query-responsive search result document. In some of those versions, the one or more user-dependent measures for the query-responsive search result document are based on relation of the query-responsive search result document to: attributes of a user profile for the query, recent queries at the client device or via the user profile, and/or recent non-query interactions at the client device or via the user profile.

In some implementations, selecting the set of search result documents further includes selecting, for inclusion in the set, a related-query-responsive search result document based on the related-query-responsive search result document being responsive to a related query determined to have a correlation to the query. In some versions of those implementations selecting, for inclusion in the set, the related-query-responsive search result document includes selecting the related-query-responsive search result document based on one or more corresponding query-dependent measures for the related-query-responsive search result document and for the related query. In some additional or alternative versions of those implementations, selecting the related-query-responsive search result document is based on determining that a magnitude of the correlation satisfies a threshold. The magnitude of the correlation is optionally based on a quantity of occurrences of the query and the related query both being issued by a corresponding device or account within temporal proximity of one another.

In some implementations, the method further includes causing a selectable link, to a given document of the search result documents of the set, to be rendered at the client device along with rendering of the NL based summary. In some versions of those implementations, the selectable link is rendered as part of an additional search result that is separate from the NL based summary. In some other versions of those implementations, the selectable link is rendered as part of the NL based summary. In some of those other versions, the selectable link is rendered as corresponding to a portion of content, of the NL based summary, based on determining that the portion of content is verifiable based on document content of the given document. In some of those other versions, the method further includes determining that the portion of content, of the NL based summary, is verifiable based on document content of the given document. Determining that the portion of content is verifiable based on document content of the given document can optionally include comparing the portion of content to the document content and determining, based on the comparing, that the portion of content is verifiable based on document content of the given document. Comparing the portion of content to the document content can optionally include: processing the portion of content, using an encoder model, to generate a content embedding of the portion of content and processing the document content, using the encoder model, to generate a document content embedding of the document content—and determining, based on the comparing, that the portion of content is verifiable based on document content of the given document can optionally include: determining a distance measure between the content embedding and the document content embedding; and determining, based on the distance measure, that the portion of content is verifiable based on document content of the given document. In some of those other versions, processing, using the LLM, the corresponding content, includes processing the document content of the given document and processing a source identifier, for the given document, that associates the document content with the source identifier. Further, the LLM output include a portion of LLM output that corresponds to the portion of content and that includes the source identifier, and determining that the portion of content is verifiable based on document content of the given document includes: determining, based on the portion of LLM output, that corresponds to the portion of content, including the source identifier for the given document, that the portion of content is verifiable based on document content of the given document. In some of those other versions, the link is rendered as corresponding to the portion of content based on being rendered as a selectable icon following the portion of the content and the portion of the content being highlighted.

In some implementations, the method further includes: causing a selectable link, to an additional document not included in the search result documents of the set, to be rendered at the client device as corresponding to a portion of content of the NL based summary. The selectable link is rendered as corresponding to a portion of content, of the NL based summary, based on determining that the portion of content is verifiable based on document content of the given document.

In some implementations, the corresponding content, from each of the search result documents of the set and processed using the LLM in generating the LLM output, includes document content of a given document of the search result documents of the set, and the given content includes text content that is based on a portion of text of the given document, image content that is based on an image of the given document, and/or video content that is based on a video of the given document. In some versions of those implementations, the document content includes the image content and, optionally, the image content includes: recognized text from the image, an automatically generated caption of the image generated based on processing the image using an image captioning model, and/or a descriptor of an object detected as being included in the image based on processing the image using an object detection model. In some additional or alternative versions of those implementations, the document content includes the video content and, optionally, the video content includes at least a portion of an automatically generated transcription of audio of the video content. In some additional or alternative versions of those implementations, the document content includes the text content, and optionally the method further includes: generating the text content based on processing the portion of text, using an initial summarization model, to generate the text content, wherein the text content includes less characters than the portion of text.

In some implementations, the method further includes generating a confidence measure for a portion of the NL based summary, and causing the portion of the NL based summary to be rendered with a given confidence annotation, of a plurality of candidate annotations, based on the given annotation corresponding to the confidence measure for the portion of the NL based summary. In some of those implementations, generating the confidence measure is based on one or more LLM confidence measures reflected by the LLM output that corresponds to the portion of the NL based summary and/or one or more document confidence measures of a given document, of the search result documents of the set, that is determined to correspond to the portion of the NL based summary.

In some implementations, the method further includes generating a confidence measure for the entirety of the NL based summary and causing the NL based summary to be rendered with a given confidence annotation, of a plurality of candidate annotations, based on the given annotation corresponding to the confidence measure for the entirety of the NL based summary. In some of those implementations, generating the confidence measure is based on: one or more LLM confidence measures reflected by the LLM output, and/or one or more document confidence measures for the search result documents of the set.

In some implementations, the LLM output is generated without any processing, using the LLM, of the query or of any rewrite of the query.

In some implementations, the LLM is fine-tuned for a content summarization prompt and the LLM output is generated without any processing, using the LLM, of the content summarization prompt.

In some implementations, the NL based summary includes a portion that is not derivable directly from the corresponding content processed using the LLM, but is generated based on prior training of the LLM.

In some implementations, a method implemented by processor(s) is provided and includes receiving a query associated with a client device and generating large language model (LLM) output based on processing, using an LLM, the query and/or corresponding content from one or more search result documents that are responsive to the query. The method further includes generating a natural language (NL) based summary using the LLM output. The method further includes determining that a portion of content, of the NL based summary, is verifiable based on document content of a given document. The given document is included in the search result documents or is in addition to the search result documents. The method further includes, in response to receiving the query: causing the NL based summary to be rendered at the client device, and causing a selectable link, to the given document, to be rendered at the client device as corresponding to the portion of content of the NL based summary. The selectable link is rendered as corresponding to the portion of content, of the NL based summary, based on determining that the portion of content is verifiable based on document content of the given document.

In some implementations, determining that the portion of content is verifiable based on document content of the given document includes comparing the portion of content to the document content and determining, based on the comparing, that the portion of content is verifiable based on document content of the given document. In some of those implementations, comparing the portion of content to the document content includes: processing the portion of content, using an encoder model, to generate a content embedding of the portion of content and processing the document content, using the encoder model, to generate a document content embedding of the document content. In those implementations, determining, based on the comparing, that the portion of content is verifiable based on document content of the given document can optionally include: determining a distance measure between the content embedding and the document content embedding and determining, based on the distance measure, that the portion of content is verifiable based on document content of the given document.

In some implementations, the link is rendered as corresponding to the portion of content based on being rendered as a selectable icon following the portion of the content and the portion of the content being highlighted.

In some implementations, a method implemented by processor(s) is provided and includes receiving a query associated with a client device and generating large language model (LLM) output based on processing input using an LLM. The input is based on the query and/or corresponding content from one or more search result documents that are responsive to the query. The method further includes generating a natural language (NL) based summary using the LLM output and causing the NL based summary to be rendered, at the client device, along with corresponding links to one or more of the search result documents that are responsive to the query. The method further includes determining, subsequent to the NL based summary being rendered at the client device, occurrence of an interaction with a given search result document of the search result documents. The method further includes, based on determining the occurrence of the interaction with the given search result document: generating revised LLM output based on processing revised input using the LLM or an additional LLM. The revised input reflects occurrence of the interaction with the given search result document, and the input does not reflect the occurrence of the interaction with the given search result document. The method further includes generating a revised NL based summary using the revised LLM output and causing the revised NL based summary to be rendered at the client device.

In some implementations, the interaction with the given search result document includes viewing of at least part of the given search result document. In some versions of those implementations, the interaction with the given search result document includes viewing of at least part of the given search result document for at least a threshold duration of time. In some of those versions, causing the revised NL based summary to be rendered at the client device includes causing the revised NL based summary to, after the viewing of at least part of the given search result document, supplant the NL based summary in a graphical interface that initially rendered the NL based summary. In some additional or alternative versions of those implementations, causing the revised NL based summary to be rendered at the client device includes causing the revised NL based summary to be rendered responsive to receiving, after the viewing of at least part of the given search result document, another occurrence of the query formulated based on further user interface input at the client device. In some additional or alternative versions of those implementations, causing the revised NL based summary to be rendered at the client device includes causing the revised NL based summary to be rendered responsive receiving, after the viewing of at least part of the given search result document, an additional query that is formulated based on further user interface input at the client device and that is determined to be similar to the query.

In some implementations, generating the revised LLM output includes processing the revised input using the LLM, the revised input includes a revised prompt that reflects familiarity with given content of the given search result document, and the input, processed using the LLM to generate the LLM output, lacks any prompt that reflects familiarity with given content of the given search result document.

In some implementations, generating the revised LLM output includes processing the revised input using the additional LLM, the additional LLM is fine-tuned based on a prompt that reflects familiarity with content, and the LLM is not fine-tuned based on any prompt that reflects familiarity with content.

In some implementations, a method implemented by processor(s) is provided and includes: receiving a query associated with a user of a client device and determining, based on the query and/or search result documents that are responsive to the query, that the user is already familiar with certain content that is responsive to the query. The method further includes generating large language model (LLM) output based on processing input using an LLM. The input is based on the query and/or corresponding content from one or more search result documents that are responsive to the query, and reflects familiarity with the certain content. The method further includes generating a natural language (NL) based summary using the LLM output, and causing the NL based summary to be rendered at the client device responsive to the query.

In some implementations, a method implemented by processor(s) is provided and includes receiving a query formulated based on user interface input at a client device. The method further includes selecting, from a plurality of candidate generative models, a particular subset of the candidate generative models to utilize in generating one or more responses to render responsive to receiving the query. Selecting the particular subset can be based on, for example, processing the query and/or search result documents that are responsive to the query. The method further includes, in response to a given generative model being included in the particular subset, causing a given response, generated based on the query and using the given generative model, to be rendered in response to receiving the query.

In some implementations, selecting the particular subset includes processing the query using a classifier to generate classifier output, determining that the classifier output indicates the particular subset, and selecting the particular subset based on determining that the classifier output indicates the particular subset.

In some implementations, selecting the particular subset includes determining that the query includes or omits one or more terms, determining that the inclusion or the omission of the one or more terms indicates the particular subset, and selecting the particular subset based on determining that the inclusion or the omission of the one or more terms indicates the particular subset.

In some implementations, the candidate generative models include an informational large language model (LLM) fine-tuned based on an information summarization prompt and a creative LLM fine-tuned based on a creative generation prompt. In some of those implementations, the particular subset includes one of the informational LLM and the creative LLM and omits the other of the informational LLM and the creative LLM.

In some implementations, the candidate generative models include a given large language model (LLM) paired with a first prompt to be used in response generation, and the given LLM paired with a second prompt to be used in response generation. In some of those implementations, the particular subset includes one of the given LLM paired with the first prompt and the given LLM paired with the second prompt and omits the other of the given LLM paired with the first prompt and the given LLM paired with the second prompt.

In some implementations, the method further includes, in response to an additional given generative model being included in the particular subset: causing an additional given response, generated based on the query and using the additional given generative model, to be rendered in response to receiving the query and to be rendered along with the given response.

In some implementations, the method further includes generating, based on the query and using the given generative model, the given response. In some of those implementations, generating the given response based on the query includes generating the given response based on content of one or more search result documents determined to be responsive to the query.

In some implementations, the candidate generative models include a large language model (LLM), a text-to-image model, and/or an additional LLM.

In some implementations, a method implemented by processor(s) is provided and includes generating a query based on one or more of a profile of a user, a history of the user, and a context of the user. The method further includes selecting a set of search result documents, including selecting, for inclusion in the set, a plurality of query-responsive search result documents based on the query-responsive search result documents being responsive to the query. The method further includes generating large language model (LLM) output based on processing, using an LLM, corresponding content from each of the search result documents of the set. The method further includes generating a natural language (NL) based summary using the LLM output and causing the NL based summary to be rendered at a client device of the user.

In some implementations, automatically generating the query is based on previous input, by the user, that requests a periodic update on one or more topics related to the query.

In some implementations, generating the query is performed automatically without any explicit action by the user.

In some implementations, a method implemented by processor(s) is provided and includes receiving a query associated with a client device and generating LLM output based on processing input using an LLM. The input is based on the query and/or is based on corresponding content from one or more search result documents that are responsive to the query. The method further includes generating a natural language (NL) based summary using the LLM output, and causing the NL based summary to be rendered, at the client device, along with corresponding links to one or more of the search result documents that are responsive to the query. The method further includes determining, subsequent to the NL based summary being rendered at the client device, occurrence of an interaction with a given search result document of the search result documents. The method further includes, based on determining the occurrence of the interaction with the given search result document: generating revised LLM output based on processing revised input using the LLM or an additional LLM. The revised input (processed in generating the revised LLM output) reflects occurrence of the interaction with the given search result document, and the input (processed in generating the LLM output) does not reflect the occurrence of the interaction with the given search result document. The method further includes generating a revised NL based summary using the revised LLM output, and causing the revised NL based summary to be rendered at the client device.

In some implementations, the interaction with the given search result document includes viewing of at least part of the given search result document, such as viewing of at least part of the given search result document for at least a threshold duration of time. In some versions of those implementations, causing the revised NL based summary to be rendered at the client device includes causing the revised NL based summary to, after rendering of at least part of the given search result document at the client device, supplant the NL based summary in a graphical interface that initially rendered the NL based summary. In some additional or alternative versions of those implementations, the NL based summary is rendered, along with the search result document, during at least an initial duration of the interaction with the given search result document, and causing the revised NL based summary to be rendered at the client device includes causing the revised NL based summary to, after at least the initial duration of the interaction with the given search result document, supplant the NL based summary. In some additional or alternative versions of those implementations, causing the revised NL based summary to be rendered at the client device comprises causing the revised NL based summary to be rendered responsive to receiving, after rendering of at least part of the given search result document on the client device, an additional occurrence of the query in association with the client device. For example, the method could further include detecting the additional occurrence of the query and causing the revised NL based summary to be rendered responsive to detecting the additional occurrence of the query. In some additional or alternative versions of those implementations, causing the revised NL based summary to be rendered at the client device comprises causing the revised NL based summary to be rendered responsive to receiving, after the viewing of at least part of the given search result document, an additional query that is formulated based on user interface input at the client device and that is determined to be similar to the query. For example, the method could further include determining that the additional query satisfies one or more similarity criteria relative to the query and, in response to determining that the additional query satisfies the one or more similarity criteria, causing the revised NL based summary to be rendered responsive to detecting the additional occurrence of the query.

In some implementations, generating the revised LLM output includes processing the revised input using the LLM, where the revised input includes a revised prompt that reflects familiarity with given content of the given search result document, and where the input, processed using the LLM to generate the LLM output, lacks any prompt that reflects familiarity with given content of the given search result document.

In some implementations, generating the revised LLM output includes processing the revised input using the additional LLM, the additional LLM is fine-tuned based on a prompt that reflects familiarity with content, and the LLM is not fine-tuned based on any prompt that reflects familiarity with content.

In some implementations, the input, processed using the LLM in generating the LLM output, is based on the corresponding content from the one or more search result documents that are responsive to the query. In some versions of those implementations, the method further includes selecting the one or more search result documents, including selecting, for inclusion among the one or more search result documents, a plurality of query-responsive search result documents based on the query-responsive search result documents being responsive to the query. In some of those versions, selecting the one or more search result documents including selecting, for inclusion among the one or more search result documents, a related-query-responsive search result document based on the related-query-responsive search result document being responsive to a related query determined to have a correlation to the query.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more transitory or non-transitory computer readable storage media storing computer instructions executable by one or more processors to perform any of the aforementioned methods. Some implementations also include a computer program product including instructions executable by one or more processors to perform any of the aforementioned methods.

What is claimed is:

1. A system, comprising:
memory storing instructions;
one or more processors operable to execute the instruction to:
  receive a query associated with a client device;
  in response to receiving the query:
    select a set of search result documents, wherein in selecting the set of search result documents one or more of the processors are to select, for inclusion in the set, a plurality of query-responsive search result documents based on the query-responsive search result documents being responsive to the query;
    generate large language model (LLM) output based on processing, using an LLM, the query and corresponding content from each of the search result documents of the set of search result documents;
    generate a natural language (NL) based summary using the LLM output;
    determine that a first portion of content, of the NL based summary, is verifiable based on first document content of a first document of the set of search result documents;
    determine that a second portion of content, of the NL based summary, is verifiable based on second document content of a second document of the set of search result documents, the second portion of content being disparate from the first portion of content;
    determine that the first portion of content, of the NL based summary, is also verifiable based on third document content of a third document;
    cause the NL based summary to be rendered at the client device, wherein in causing the NL based summary to be rendered at the client device one or more of the processors are to:
      cause a first selectable graphical element to be rendered immediately after the first portion of content, wherein the first selectable graphical element, when selected, causes navigation to the first document, and wherein the first selectable graphical element is rendered immediately after the first portion of content responsive to determining that the first portion of content is verifiable based on the first document content of the first document,
      cause a second selectable graphical element to be rendered immediately after the second portion of content, wherein the second selectable graphical element, when selected, causes navigation to the second document, and wherein the second selectable graphical element is rendered immediately after the second portion of the content responsive to determining that the second portion of the content is verifiable based on the second document content of the second document, and
      cause a third selectable graphical element to be rendered immediately after the first portion of content, wherein the third selectable graphical element, when selected, causes navigation to the third document, and wherein the third selectable graphical element is rendered immediately after the first portion of content responsive to determining that the first portion of content is also verifiable based on the third document content of the third document.

2. The system of claim 1, wherein the first search result document and the second search result document are among the query-responsive search result documents that are responsive to the query.

3. The system of claim 1, wherein in determining that the first portion of content is verifiable based on first document content of the first document one or more of the processors are to:
compare the first portion of content to the first document content; and
determine, based on the comparing, that the first portion of content is verifiable based on the first document content of the first document.

4. The system of claim 3,
wherein in comparing the first portion of content to the first document content one or more of the processors are to:
process the first portion of content, using an encoder model, to generate a content embedding of the first portion of content; and
process the first document content, using the encoder model, to generate a document content embedding of the first document content; and
wherein in determining, based on the comparing, that the first portion of content is verifiable based on the first document content of the first document one or more of the processors are to:
determine a distance measure between the content embedding and the document content embedding; and
determine, based on the distance measure, that the first portion of content is verifiable based on the first document content of the first document.

5. The system of claim 1, wherein one or more of the processors are further operable to execute the instructions to:
in response to receiving the query:
cause additional search results to be rendered at the client device along with, but separate from, the NL based summary,
wherein in causing the additional search results to be rendered, one or more of the processors are to cause the additional search results to be rendered based on the additional search results being responsive to the query, and
wherein the additional search results are for corresponding search result documents that are in addition to those of the set of search result documents.

6. The system of claim 1, wherein the NL based summary is initially rendered without also rendering additional search results that are for corresponding search result documents that are responsive to the query and that are in addition to those of the set of search result documents.

7. The system of claim 6, wherein one or more of the processors are further operable to execute the instructions to:
cause a selectable additional search result element to be rendered along with initial rendering of the NL based summary; and
in response to a selection of the selectable additional search result element:
cause the additional search results to be rendered at the client device along with, but separate from, the NL based summary.

8. The system of claim 1, wherein one or more of the processors are further operable to execute the instructions to:
prior to generating the LLM output:
determine whether to utilize the LLM in generating one or more responses to render responsive to receiving the query;
wherein generating the LLM output, using the LLM, is responsive to determining to utilize the LLM in generating one or more responses to render responsive to receiving the query.

9. The system of claim 8, wherein in determining whether to utilize the LLM in generating one or more responses to render responsive to receiving the query one or more of the processors are to:
determine, based on one or more query features of the query and/or based on one or more result features, whether to utilize the LLM, wherein the one or more result features are based on one or more of the query-responsive search result documents that are responsive to the query.

10. The system of claim 1, wherein in generating the LLM output based on processing, using the LLM, the query and the corresponding content from each of the search result documents of the set of search result documents one or more of the processors are to:
generate a prompt that includes the query, the corresponding content, and one or more additional terms that are in addition to those of the query and the corresponding content; and
process the prompt, using the LLM, to generate the LLM output.

11. The system of claim 1, wherein the query associated with the client device is automatically generated based on one or more of a profile of a user of the client device, a history of the user, and a context of the user.

12. A method implemented by one or more processors, the method comprising:
receiving a query formulated based on user interface input at a client device;
in response to receiving the query:
selecting a set of search result documents, selecting the set of search result documents including selecting, for inclusion in the set, a plurality of query-responsive search result documents based on the query-responsive search result documents being responsive to the query;
generating a prompt based on the query and based on corresponding content from each of the search result documents of the set of search result documents;
causing generation of a natural language (NL) based summary, causing generation of the NL based summary including causing the prompt to be processed, utilizing a large language model (LLM), to generate LLM output that reflects the NL based summary;
determining that a first portion of content, of the NL based summary, is verifiable based on first document content of a first document of the set of search result documents;
determining that a second portion of content, of the NL based summary, is verifiable based on second document content of a second document of the set of search result documents, the second portion of content being disparate from the first portion of content;

determining that the first portion of content, of the NL based summary, is also verifiable based on third document content of a third document;
causing the NL based summary to be rendered at the client device, comprising:
  causing a first selectable graphical element to be rendered immediately after the first portion of content, wherein the first selectable graphical element, when selected, causes navigation to the first document, and wherein the first selectable graphical element is rendered immediately after the first portion of content responsive to determining that the first portion of content is verifiable based on the first document content of the first document,
  causing a second selectable graphical element to be rendered immediately after the second portion of content, wherein the second selectable graphical element, when selected, causes navigation to the second document, and wherein the second selectable graphical element is rendered immediately after the second portion of the content responsive to determining that the second portion of the content is verifiable based on the second document content of the second document, and
  causing a third selectable graphical element to be rendered immediately after the first portion of content, wherein the third selectable graphical element, when selected, causes navigation to the third document, and wherein the third selectable graphical element is rendered immediately after the first portion of content responsive to determining that the first portion of content is also verifiable based on the third document content of the third document.

13. The method of claim 12, wherein the third document is included in the set of search result documents.

14. The method of claim 12, wherein the first search result document and the second search result document are among the query-responsive search result documents that are responsive to the query.

15. The method of claim 12, wherein determining that the first portion of content is verifiable based on first document content of the first document comprises:
comparing the first portion of content to the first document content; and
determining, based on the comparing, that the first portion of content is verifiable based on the first document content of the first document.

16. The method of claim 15,
wherein comparing the first portion of content to the first document content comprises:
  processing the first portion of content, using an encoder model, to generate a content embedding of the first portion of content; and
  processing the first document content, using the encoder model, to generate a document content embedding of the first document content; and
wherein determining, based on the comparing, that the first portion of content is verifiable based on the first document content of the first document comprises:
  determining a distance measure between the content embedding and the document content embedding; and
  determining, based on the distance measure, that the first portion of content is verifiable based on the first document content of the first document.

17. The method of claim 12, further comprising:
in response to receiving the query:
  causing additional search results to be rendered at the client device along with, but separate from, the NL based summary,
  wherein causing the additional search results to be rendered is based on the additional search results being responsive to the query, and
  wherein the additional search results are for corresponding search result documents that are in addition to those of the set of search result documents.

18. The method of claim 12, wherein the NL based summary is initially rendered without also rendering additional search results that are for corresponding search result documents that are responsive to the query and that are in addition to those of the set of search result documents.

19. The method of claim 12, further comprising:
prior to causing generation of the NL based summary:
  determining whether to utilize the LLM in generating one or more responses to render responsive to receiving the query;
  wherein causing generation of the NL based summary is responsive to determining to utilize the LLM in generating one or more responses to render responsive to receiving the query.

20. A system, comprising:
memory storing instructions;
one or more processors operable to execute the instruction to:
  receive a query associated with a client device;
  in response to receiving the query:
    select a set of search result documents, wherein in selecting the set of search result documents one or more of the processors are to select, for inclusion in the set, a plurality of query-responsive search result documents based on the query-responsive search result documents being responsive to the query;
    generate large language model (LLM) output based on processing, using an LLM, the query and corresponding content from each of the search result documents of the set of search result documents, wherein in generating the LLM output based on processing, using the LLM, the query and the corresponding content from each of the search result documents of the set of search result documents one or more of the processors are to:
      generate a prompt that includes the query, the corresponding content, and one or more additional terms that are in addition to those of the query and the corresponding content; and
      process the prompt, using the LLM, to generate the LLM output;
    generate a natural language (NL) based summary using the LLM output;
    determine that a first portion of content, of the NL based summary, is verifiable based on first document content of a first document of the set of search result documents;
    determine that a second portion of content, of the NL based summary, is verifiable based on second document content of a second document of the set of search result documents, the second portion of content being disparate from the first portion of content;
    cause the NL based summary to be rendered at the client device, wherein in causing the NL based summary to be rendered at the client device one or more of the processors are to:
- cause a first selectable graphical element to be rendered immediately after the first portion of content, wherein the first selectable graphical element, when selected, causes navigation to the first document, and wherein the first selectable graphical element is rendered immediately after the first portion of content responsive to determining that the first portion of content is verifiable based on the first document content of the first document, and
- cause a second selectable graphical element to be rendered immediately after the second portion of content, wherein the second selectable graphical element, when selected, causes navigation to the second document, and wherein the second selectable graphical element is rendered immediately after the second portion of the content responsive to determining that the second portion of the content is verifiable based on the second document content of the second document.

21. The system of claim 20, wherein the first search result document and the second search result document are among the query-responsive search result documents that are responsive to the query.

22. The system of claim 20, wherein one or more of the processors are further operable to execute the instructions to:
in response to receiving the query:
- cause additional search results to be rendered at the client device along with, but separate from, the NL based summary,
- wherein in causing the additional search results to be rendered, one or more of the processors are to cause the additional search results to be rendered based on the additional search results being responsive to the query, and
- wherein the additional search results are for corresponding search result documents that are in addition to those of the set of search result documents.

23. The system of claim 20, wherein the NL based summary is initially rendered without also rendering additional search results that are for corresponding search result documents that are responsive to the query and that are in addition to those of the set of search result documents.

24. The system of claim 20, wherein one or more of the processors are further operable to execute the instructions to:
prior to generating the LLM output:
- determine whether to utilize the LLM in generating one or more responses to render responsive to receiving the query;
- wherein generating the LLM output, using the LLM, is responsive to determining to utilize the LLM in generating one or more responses to render responsive to receiving the query.

* * * * *